(12) United States Patent
Hirano et al.

(10) Patent No.: US 9,746,302 B2
(45) Date of Patent: Aug. 29, 2017

(54) METHOD OF PLACING WORK PIECE ON TABLE OF MEASURING DEVICE

(71) Applicant: MITUTOYO CORPORATION, Kanagawa (JP)

(72) Inventors: Kotaro Hirano, Hiroshima (JP); Ryousuke Watanabe, Kure (JP); Hisayoshi Sakai, Kawasaki (JP)

(73) Assignee: MITUTOYO CORPORATION, Kanagawa (JP)

( * ) Notice: Subject to any disclaimer, the term of this patent is extended or adjusted under 35 U.S.C. 154(b) by 152 days.

(21) Appl. No.: 14/928,209

(22) Filed: Oct. 30, 2015

(65) Prior Publication Data
US 2016/0131302 A1   May 12, 2016

(30) Foreign Application Priority Data
Nov. 10, 2014   (JP) .................. 2014-227879

(51) Int. Cl.
*B23Q 16/00* (2006.01)
*G01B 5/00* (2006.01)
*G01B 5/008* (2006.01)
*G01B 5/20* (2006.01)

(52) U.S. Cl.
CPC .......... *G01B 5/0002* (2013.01); *G01B 5/008* (2013.01); *G01B 5/201* (2013.01)

(58) Field of Classification Search
CPC ................................. G01B 5/0002
USPC ........................ 33/503, 568, 573
See application file for complete search history.

(56) References Cited

U.S. PATENT DOCUMENTS

| 4,575,942 A * | 3/1986 | Moriyama ............... B23Q 1/34 257/E21.211 |
| 5,251,156 A * | 10/1993 | Heier ................... G01B 11/005 33/503 |
| 5,836,080 A * | 11/1998 | Inagaki .................... B23Q 3/18 108/140 |
| 5,848,480 A * | 12/1998 | Sola ..................... G01B 21/047 33/503 |
| 2006/0101660 A1* | 5/2006 | Takanashi ............ G01B 5/0002 33/503 |
| 2014/0236520 A1* | 8/2014 | Engel ................. G01D 5/24452 702/95 |
| 2014/0290083 A1* | 10/2014 | Dai .......................... G01B 5/02 33/700 |

(Continued)

FOREIGN PATENT DOCUMENTS

| JP | H02-062006 B2 | 12/1990 |
| JP | H03-8969 Y2 | 3/1991 |
| JP | 2003-045942 A | 2/2003 |

*Primary Examiner* — G. Bradley Bennett
(74) *Attorney, Agent, or Firm* — Greenblum & Bernstein, P.L.C.

(57) ABSTRACT

A method of placing a work piece on a measuring device in which a work piece is placed on a table of a measuring device is provided. The method includes: using a retainer capable of holding the work piece above the table and a lifting/lowering device lifting and lowering a top surface of the table; holding the work piece above the table with the retainer; lifting the top surface of the table with the lifting/lowering device to bring the top surface of the table into contact with a bottom surface of the work piece; and, after a load of the work piece is borne by the table, releasing the hold of the retainer on the work piece.

10 Claims, 21 Drawing Sheets

(56) References Cited

U.S. PATENT DOCUMENTS

2015/0131697 A1* 5/2015 Sakai .................. G01B 21/045
374/56
2016/0195383 A1* 7/2016 Smith .................. G01B 21/042
33/502

* cited by examiner

PRIOR ART

PRIOR ART

PRIOR ART

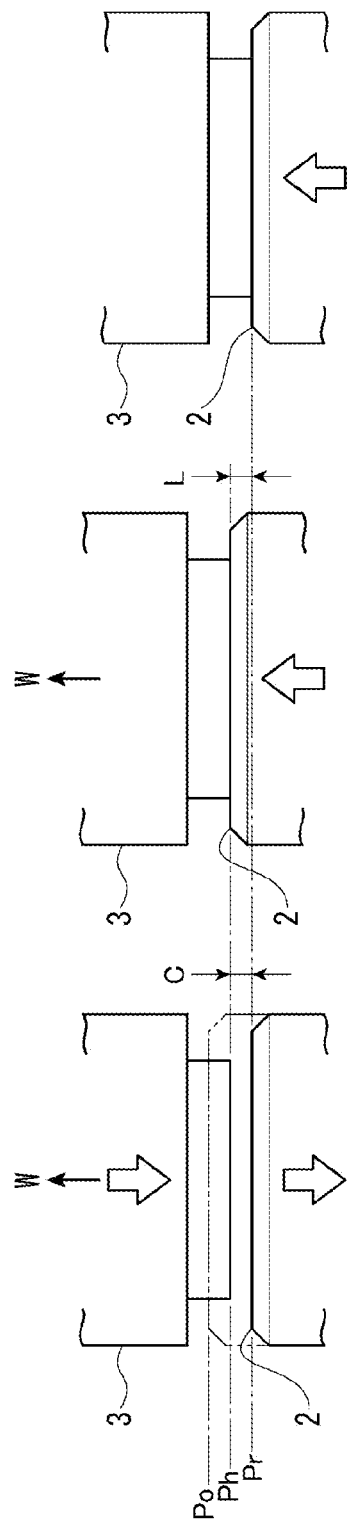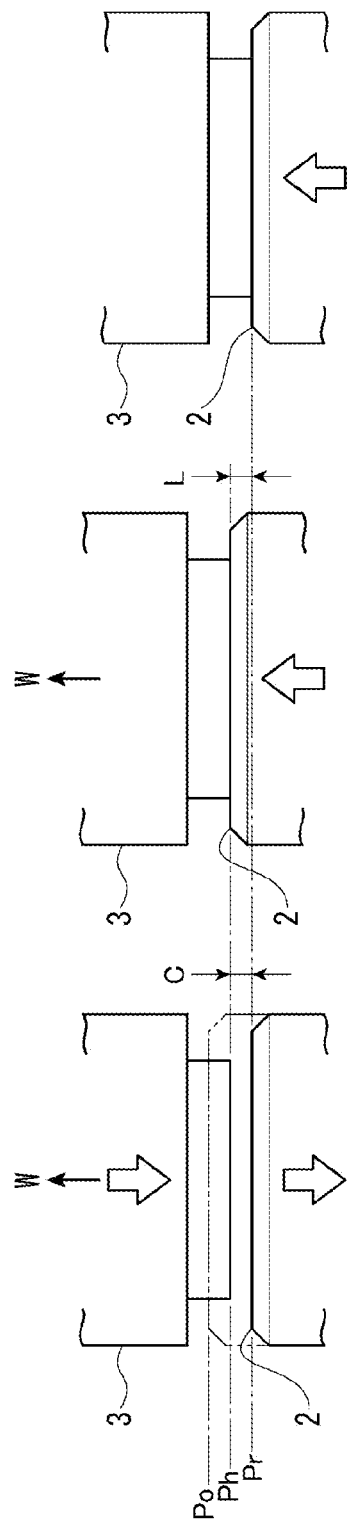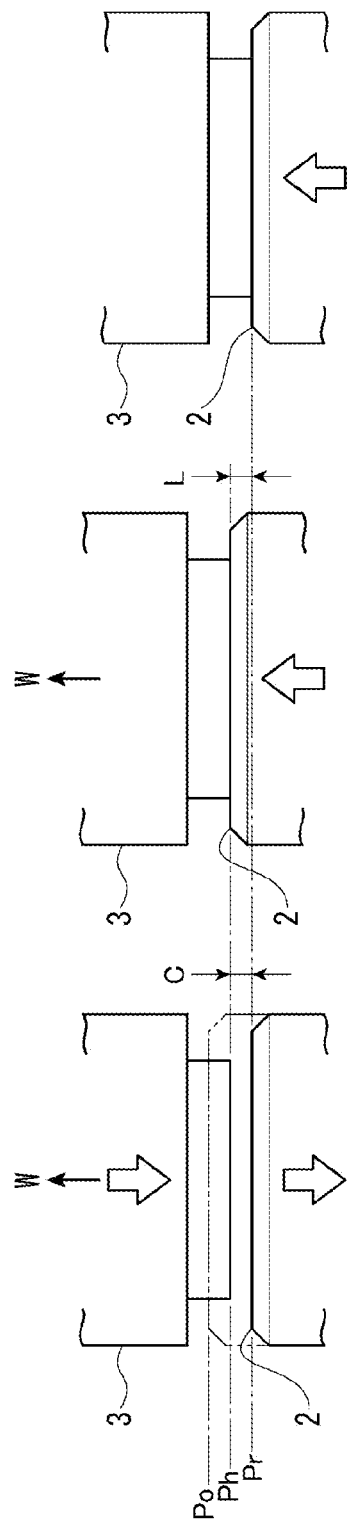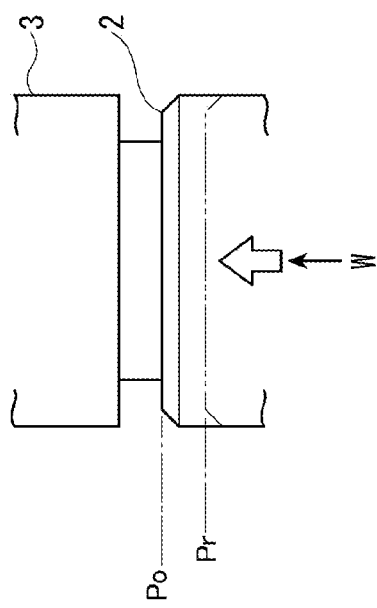

METHOD OF PLACING WORK PIECE ON TABLE OF MEASURING DEVICE

CROSS-REFERENCE TO RELATED APPLICATIONS

The present application claims priority under 35 U.S.C. §119 of Japanese Application No. 2014-227879, filed on Nov. 10, 2014, the disclosure of which is expressly incorporated by reference herein in its entirety.

BACKGROUND OF THE INVENTION

1. Field of the Invention

The present invention relates to a method of placing a work piece on a measuring device and to a measuring device.

2. Description of Related Art

Various kinds of measuring devices are used to measure dimensions or a shape of a product. For example, a coordinate measuring device is used to measure various point positions on a surface of a product. A surface characteristic measuring device (shape measuring device, profile measuring device, or surface roughness measuring device) is used to measure a fine shape, profile, or roughness of the surface of the product. A roundness measuring device is used to measure roundness of a cylindrical product, for example.

In these measuring devices, a work piece (measured object) is placed on a table (stage) for measurement. Then, a measurement of various portions of the work piece is performed while displacing a measurement head corresponding to each type of measurement relative to the table. Various formats are used for the relative displacement of the table and measurement head. However, in many measuring devices, the table is displaced and a highly accurate guide mechanism or bearing mechanism is employed in the displacement mechanism to ensure accuracy of the measuring device.

For example, in a roundness measuring device, a rotating table is used in order to rotate a work piece and measure a circumferential surface thereof. In order to achieve highly accurate rotation, the rotating table employs an air bearing (see Japanese Utility Model Publication No. H03-008969). In the air bearing of the rotating table, an air layer of between several μm and tens of μm (microns) is formed in a gap between a rotor (on a rotation side) and a stator (on a fixed side), and the rotor is floating supported with respect to the stator by rigidity of the air layer, achieving non-contact rotation. The rotor and the stator each have a pressure-receiving surface facing the pressure-receiving surface of the other with the air layer therebetween. A shape of each pressure-receiving surface greatly influences rotation accuracy, which is a major capability of the roundness measuring device. Accordingly, in order to achieve a high degree of rotation accuracy, geometric accuracy on a submicron order is required in the finish working of the pressure-receiving surfaces of the rotor and stator in the air bearing.

In recent years, the size of measured objects in measuring devices has been getting extremely large. For example, roundness measurement has been required for extremely large work pieces such as wind power generator rotors and water turbines. In order to place such large work pieces on a table of a measuring device, the work piece has been suspended by a lifting device such as a crane or lifter. However, fine movement cannot be expected in suspending an extremely large work piece from a crane, as compared to a situation in which a worker carefully places a small work piece on a table.

In other words, in the work of suspending the extremely large work piece from the crane, after the work piece is displaced to a vicinity above a table surface, the work piece must be lowered slowly so as to not cause a collision in order to prevent damage to the work piece and table. However, although a skilled worker may be capable of the fine movement described above, an ordinary worker may find the operation difficult. Moreover, a typical crane or lifter may be unable to set an adequately low speed, or movement may be intermittent. Given this background, when suspended from a crane or the like, collisions are likely to occur between the work piece and the measurement table. Also, in a case where a work piece having a large mass is suspended by a crane or the like, a collision with the work piece is also large, and there is a possibility that the guide mechanism or bearing mechanism of the measuring device, which are highly accurate but not resilient, may be damaged or the like.

For example, in a case where a work piece is loaded onto the above-described rotating table of the roundness measuring device, the load of the work piece is absorbed by the air layer between the rotor and stator. In this example, the loaded work piece is extremely large and is very heavy, and when loaded with impact, the load capacity of the air layer of the air bearing is exceeded, and the opposing surfaces of the rotor and stator may come into contact with each other. When such contact occurs, the opposing surfaces of the air bearing may be damaged, degrading the rotation accuracy. In addition, when significant damage (a galling) is caused by contact between solids during rotation, the rotation operation may itself become impossible. Several strategies have been suggested in response to these issues.

A device and method for transporting a work piece to a coordinate measuring device is disclosed in Japanese Patent Publication No. H02-062006. In this document, a transportable stage is installed above a stage of the measuring device. In addition, the transportable stage is displaced from below a measurer onto a displacement bed on a side of the measuring device, and in this state, the work piece is suspended from above by a crane and placed onto the transportable stage. Then, the transportable stage, together with the work piece placed on the transportable stage, is drawn onto the stage (i.e., below the measurer) and measurement is performed. With this configuration, a collision during suspension from the crane is suffered by the displacement bed on the side of the measuring device, and an effect on the stage of the measuring device can be avoided.

Japanese Patent Laid-open Publication No. 2003-045492 discloses a measuring apparatus that includes an anti-vibration table and is configured to prevent a work table from vibrating and damaging a work piece during transfer of the work piece. In this document, the configuration is such that when the work piece is transferred, the work table of the anti-vibration table can be drawn downward and locked. By locking in this way, when the work piece is transferred, the work table can be prevented from vibrating and damaging the work piece due to an external force, and the inherent vibration prevention performance can be utilized by unlocking the work table.

In the configuration disclosed by Japanese Patent Publication No. H02-062006, described above, even when the work piece suspended from the crane collides with the transportable stage during transport, the effect on the stage of the measuring device can be mitigated. However, the transportable stage and a mechanism to draw the transportable stage sideways are required, unavoidably complicating the structure. Moreover, the configuration disclosed by Japanese Patent Publication No. H02-062006 is not able to mitigate collisions between the transported work piece and the transportable stage. In addition, when a collision occurs between the transportable stage and the work piece, the transportable stage and the work piece may be damaged.

In the configuration disclosed by Japanese Patent Laid-open Publication No. 2003-045492, described above, the work table can be prevented from vibrating due to an external force and damaging the work piece while transporting the work piece. However, the configuration disclosed in this document is not able to mitigate collisions between the transported work piece and the work table. In addition, when a collision occurs between the work table and the work piece, the work piece and work table, as well as the measuring device, may be damaged.

SUMMARY OF THE INVENTION

The present invention provides a method of placing a work piece on a measuring device, and a measuring device, capable of mitigating collisions of the work piece during transport without complicating a structure of the device.

A method of placing a work piece on a measuring device according to the present invention is a method of placing a work piece on a measuring device in which a work piece is placed on a table of a measuring device. The method includes: using a retention device (also referred to as a "retainer") capable of holding the work piece above the table and a lifting/lowering device lifting and lowering a top surface of the table; holding the work piece above the table with the retention device; lifting the top surface of the table with the lifting/lowering device to bring the top surface of the table into contact with a bottom surface of the work piece; and, after a load of the work piece is borne by the table, releasing the hold of the retention device on the work piece.

In the present invention, by lifting the table relative to the work piece, which is held above the table, contact can be made between the work piece and the table while the work piece remains in a state held by the retention device. In addition, in a state where contact has been made, the load is borne on the table and a burden on the retention device is removed; accordingly, the work piece can be placed on the table. In other words, an operation to shift the load of the work piece from the retention device to the table is performed in a state where the work piece and the table are already in contact. Therefore, circumstances for a collision do not occur.

In addition, in the present invention, a conventional crane or the like can be utilized as the retention device holding the work piece, an existing mechanism in the measuring device can be used as the lifting/lowering device lifting and lowering the table, or, even in a case where an additional configuration is used, a simple device configuration can be retained. In this way, the above-noted issues can be resolved by the present invention.

Moreover, various measuring devices measuring a dimension or shape of a product fall within the scope of the measuring device to which the present invention is applied. For example, the present invention can be applied to a coordinate measuring device measuring various point positions on a surface of a product; a surface characteristic measuring device measuring a fine shape, profile, or roughness of the surface of the product (shape measuring device, profile measuring device, or surface roughness measuring device); or a roundness measuring device measuring roundness of a cylindrical product, for example. In addition, an XY table displacing in a plane (coordinate measuring device, for example) or a rotating table (roundness measuring device, for example) can be used as the table. Examples of a table displacing in a plane may also include a table displacing only in one of the X or Y axis directions. On the other hand, the table may also be capable of displacing in a Z axis direction in addition to the two X and Y axes.

In the method of placing the work piece on the measuring device according to the present invention, an operation in which the load of the work piece is borne on the table is preferably an operation which, after lifting the table and bringing the table into contact with the bottom surface of the work piece, continues lifting the table and bears the load of the work piece on the table.

In the present invention, in a state where the work piece and the table are in contact, the load burden of the work piece can be transferred from the retention device to the table by an operation that lifts the table slightly. Therefore, when the load of the work piece is borne by the table, there is no need to move the work piece while holding the work piece above the table. In a case where the work piece has a large mass, fine operation of the retention device is required in order to lower the work piece. However, according to the present invention, the work piece is not moved, and therefore the need for such fine operation, which requires skill, can be mitigated.

Moreover, in the method of placing the work piece on the measuring device according to the present invention, an operation in which the load of the work piece is borne on the table may also be an operation which brings the table to a stop in a state where the table is in contact with the bottom surface of the work piece and lowers the work piece slightly in this state. Such an operation to slightly lower the work piece can be achieved by an operation to release the hold of the retention device on the work piece. Moreover, the load burden may also be transferred from the retention device to the table by both lifting the table and lowering the work piece.

In the method of placing the work piece on the measuring device according to the present invention, the work piece is held above the table by the retention device, the table occupying a reference position; the top surface of the table is lifted from the reference position by the lifting/lowering device and is brought into contact with the bottom surface of the work piece; after the load of the work piece is borne by the table, the hold of the retention device is released; and the top surface of the table is lowered by the lifting/lowering device and returned to the reference position.

In the present invention, the table can be lifted from the reference position (for example, measurement position where measurement is conducted with the measuring device) and brought into contact with the work piece, and after receiving the load of the work piece, the work piece and table can be returned to the reference position. Therefore, transfer of the work piece can be performed at a position higher than the reference position, and interference with surrounding equipment or the like during transport of the work piece can be avoided from the start.

In the method of placing the work piece on the measuring device according to the present invention, the top surface of the table is lowered by the lifting/lowering device to a standby position, which is lower than the reference position; the work piece is held by the retention device at a position above the table and lower than the reference position; the top surface of the table is lifted from the standby position by the lifting/lowering device and is brought into contact with the bottom surface of the work piece; after the load of the work piece is borne by the table, the hold of the retention device is released; and the top surface of the table is lifted by the lifting/lowering device and returned to the reference position.

In the present invention, the table is shunted from the reference position (for example, measurement position where measurement is conducted with the measuring device) to the standby position, and transports the work piece in this state. Therefore, the work piece prior to contact can be held in the reference position or in the vicinity thereof. Accordingly, the amount of displacement of the table to make contact with the work piece and to thereafter return to the reference position can be kept to a minimum.

A measuring device according to the present invention includes a table apparatus having a table on a top surface of which a work piece is placed, the table apparatus being installed on a base; a measuring apparatus measuring the work piece placed on the table; a lifting/lowering device installed in an area between the table and the base and lifting and lowering the table with respect to the base; and a control device (also referred to as a "controller") controlling the lifting/lowering device. The control device lifts the table, in a state where the work piece is held above the table, and brings the table into contact with the bottom surface of the work piece, after which the load of the work piece is borne by the table apparatus.

In the present invention, by performing an operation in line with the method of placing the work piece on the measuring device according to the present invention described above, the effects described for the method can be obtained. In such a case, a lifting mechanism such as an external crane may be used as the retention device in the above-described method of placing the work piece.

In the measuring apparatus according to the present invention, the lifting/lowering device preferably includes an anti-vibration table provided between the table apparatus and the base, the anti-vibration table having a bottom surface member arranged on the base, a top surface member supporting the table apparatus, and a gas spring installed on the bottom surface member and supporting the top surface member; a gas route supplying gas to the gas spring; and a control valve controlling the gas supply of the gas route. The control device preferably controls operations of the lifting/lowering device by controlling the gas supply to the gas spring using the control valve.

In the present invention, by adding the gas route, which supplies gas to the gas spring, and the control valve, which controls the gas supply of the gas route, to an existing anti-vibration table, the lifting/lowering device of the above-described method of placing the work piece on the measuring device can be achieved extremely easily.

In the measuring device according to the present invention, the anti-vibration table is preferably an anti-vibration table having tilt adjustment performance and including a plurality of the gas springs installed between the top surface member and the bottom surface member; and an adjustment valve connected to each of the gas springs, the adjustment valve adding gas from the gas route when the gas springs are compressed and exhausting gas from the gas springs when the gas springs are stretched out. The lifting/lowering device preferably includes the anti-vibration table and a valve open/close mechanism (also referred to as a "valve open/close controller") forcibly opening and closing the adjustment valve. The control device preferably controls the gas supply to the gas springs by forcibly opening and closing the adjustment valve using the valve open/close mechanism.

In the present invention, the existing anti-vibration table having tilt adjustment performance includes the gas route and the adjustment valve. Therefore, by forcibly opening and closing the adjustment valve using the valve open/close mechanism, the anti-vibration table can act as a control valve of the lifting/lowering device, enabling the lifting/lowering device to be configured using these components and enabling control using the control device. The valve open/close mechanism may be any mechanism capable of ideally achieving circumstances similar to displacement or the like in addition to the control valve when the top surface member is tilted. Examples include a solenoid, cylinder device, or the like externally operating the control valve. Accordingly, in the present invention, in addition to the existing anti-vibration table having the tilt adjustment performance, the lifting/lowering device can be achieved through the slight addition of the valve open/close mechanism, and the additional configuration of the device can be greatly simplified.

In the measuring device according to the present invention, the lifting/lowering device may be a lifting/lowering mechanism provided to the table apparatus and supporting the table so as to be capable of lifting and lowering. Examples of such a lifting/lowering mechanism can include a mechanism in which an air cylinder supporting the bottom surface of the table is provided to the table apparatus and the table is lifted and lowered with respect to a main body of the table apparatus by expanding and contracting the air cylinder.

In the present invention, the lifting/lowering device is installed within the table apparatus. Therefore, the configuration of the measuring device can be simplified and made smaller. In addition, only the table is lifted and lowered with the work piece, and the entire table apparatus need not be lifted and lowered. Therefore, drive force for lifting and lowering can be reduced.

According to the method of placing the work piece on the measuring device, and the measuring device, of the present invention, by lifting and lowering the table, the table can be brought into contact with the bottom surface of the work piece before accepting the load of the work piece, and collisions with the work piece during transport can be eliminated without complicating the structure of the device.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIGS. 15A to 15D are schematic views illustrating operations in the second embodiment;

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

First Embodiment

Figure 1:
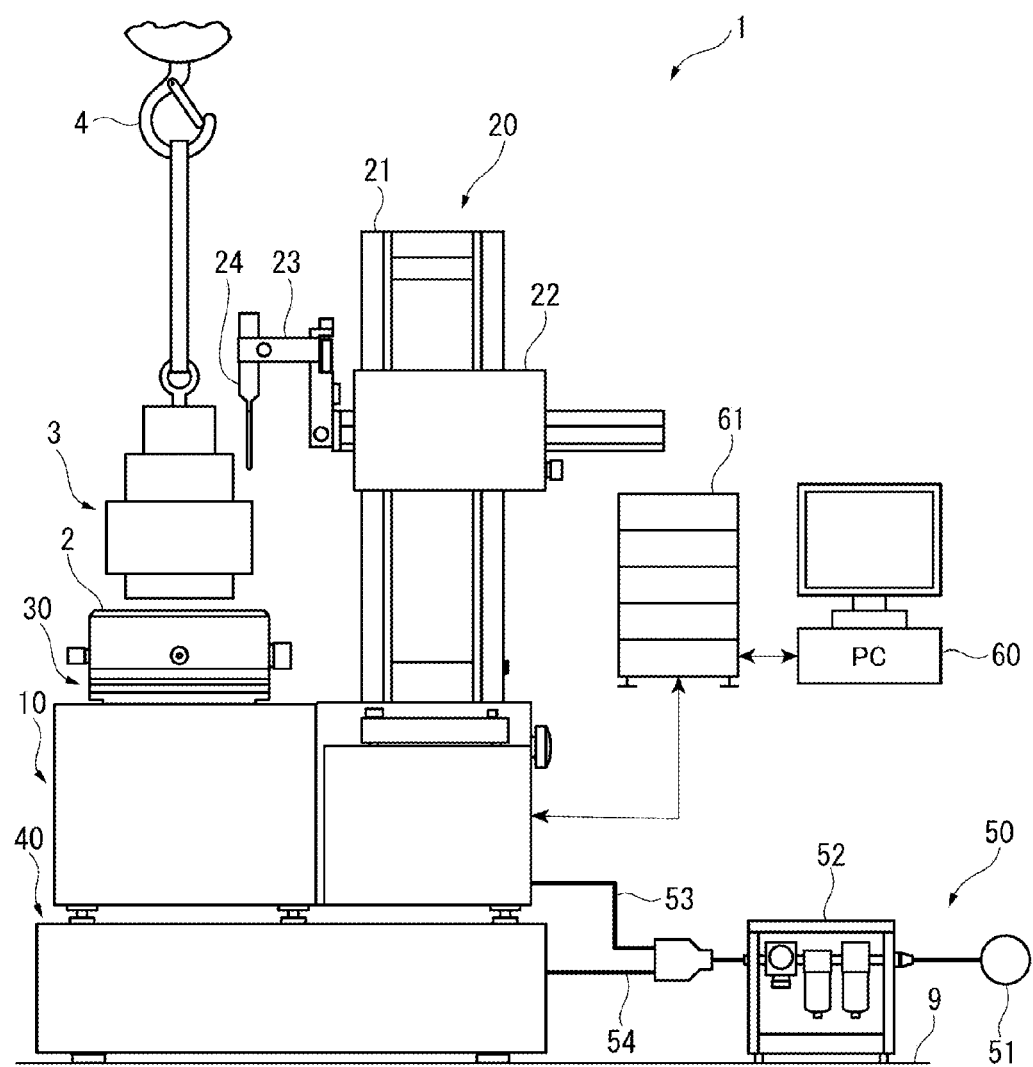
FIG. 1 illustrates an overall configuration of a first embodiment of the present invention.

In FIG. 1, a roundness measuring device 1 is a measuring device according to the present invention. The roundness measuring device 1 includes a table 2, on a top surface of which a work piece 3 (measured object) is placed. In the present embodiment, the work piece 3 has a weight greater than that which can typically be transported manually by a worker. Therefore, in order to place the work piece 3 on the table 2, a crane 4 is used from which the work piece 3 is suspended. The crane 4 corresponds to a retention device according to the present invention.

In the present embodiment, in order to prevent a collision between the work piece 3 and the table 2 when a heavy work piece 3 is transported using the crane 4 in this way, a method is used of placing a work piece on a measuring device according to the present invention.

The roundness measuring device 1 (measuring device) includes a measuring device main body 10, on a top surface of which a measuring apparatus 20 and a table apparatus 30 are installed. The measuring device main body 10 is supported on a flat base 9 via an anti-vibration table 40. The measuring device main body 10 is a highly rigid, box-shaped structure and maintains, with a high degree of accuracy, relative positions of the measuring apparatus 20 and the table apparatus 30 installed on the top surface of the measuring device main body 10. The roundness measuring device 1 further includes an air supply device 50 supplying pressurized air to the table apparatus 30 and the anti-vibration table 40; and a control device 60 controlling operations of various components.

The air supply device 50 includes a pressurized air source 51 such as an accumulator or compressor; and a filter regulator 52 filtering and adjusting the pressure of the pressurized air from the pressurized air source 51. The pressurized air from the pressurized air source 51 passes through the filter regulator 52, after which the pressurized air is supplied to the table apparatus 30 by a pipe 53 and to the anti-vibration table 40 by a pipe 54.

The control device 60 is configured by a personal computer or the like and controls operations of the measuring apparatus 20, the table apparatus 30, the anti-vibration table 40, and the air supply device 50 in accordance with a predetermined operation program. A controller 61 is interposed between the control device 60 and the measuring apparatus 20, the table apparatus 30, the anti-vibration table 40, and the air supply device 50. Measurement data obtained from the measuring apparatus 20 is processed in accordance with the predetermined operation program to create measurement results.

The measuring apparatus 20 includes a column 21 standing upright on the top surface of the measuring device main body 10; a slider 22 rising and descending along the column 21; an arm 23 supported by the slider 22 and capable of advancing and retreating horizontally; and a displacement sensor 24 supported on a forefront end of the arm 23.

In accordance with the operation program executed by the control device 60, the measuring apparatus 20 displaces the slider 22 and the arm 23 and approaches the displacement sensor 24 to the work piece 3 placed on the table 2 to conduct a measurement of a circumferential surface of the work piece 3. Measurement data from the displacement sensor 24 is transferred to the control device 60, and is passed through predetermined processing to be evaluated for roundness.

Figure 2:
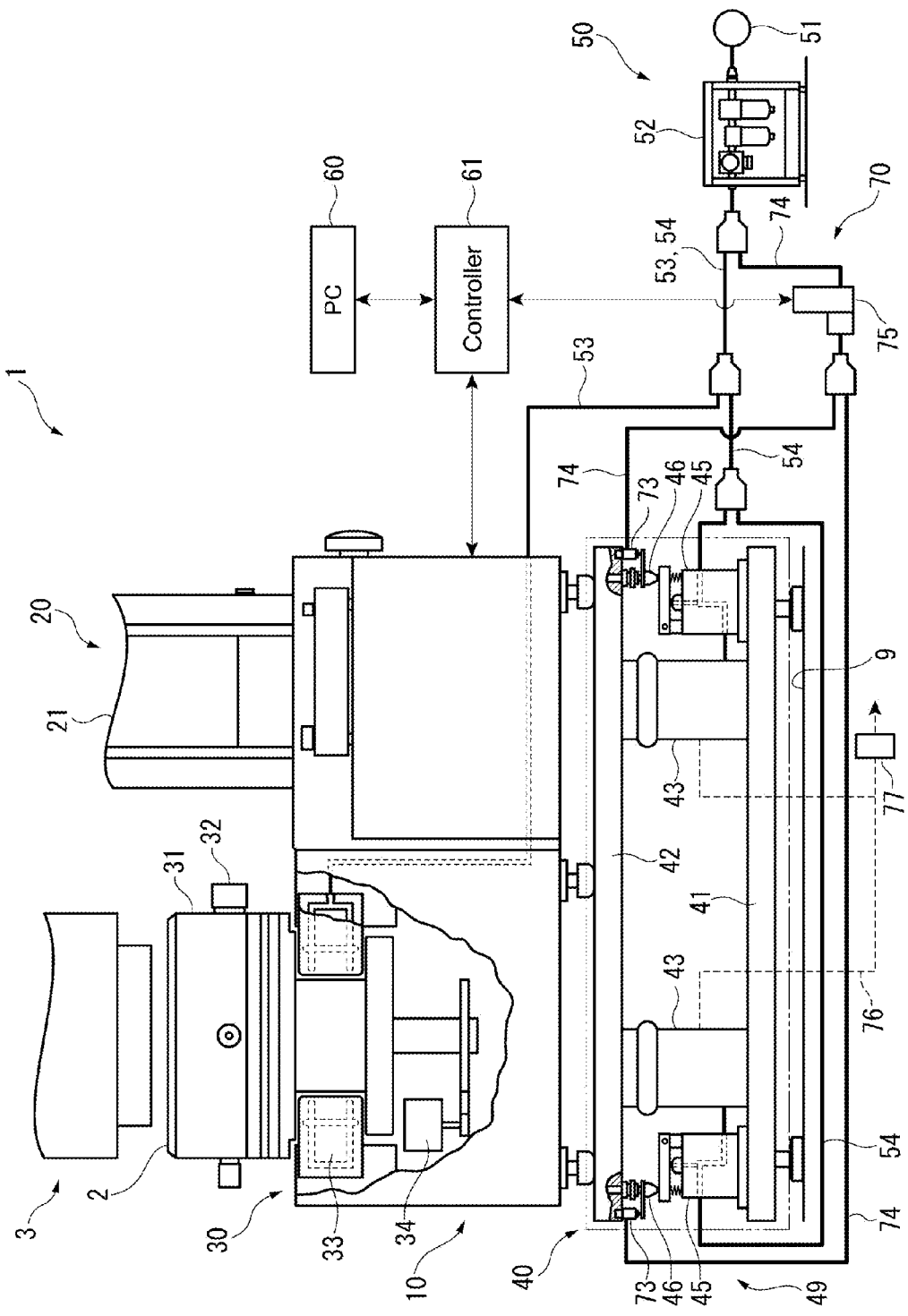
FIG. 2 illustrates a control system according to the first embodiment.

As shown in FIG. 2, the table apparatus 30 includes a table main body 31, on a top surface of which the table 2 is provided; and a biaxial adjustment mechanism 32 adjusting a horizontal position of a center axis line of the table 2 with respect to the table main body 31. The table 2 is formed in a disk shape and is supported along the top surface of the table main body 31.

The table apparatus 30 further includes an air hydrostatic bearing 33 supporting the table main body 31 so as to be freely rotatable around a rotation axis perpendicular to the measuring device main body 10; and a drive motor 34 causing the table main body 31 to rotate around the rotation axis. The air hydrostatic bearing 33 and the drive motor 34 are housed in the measuring device main body 10.

Pressurized air is supplied from the air supply device 50 to the air hydrostatic bearing 33 by the pipe 53. Using this pressurized air, a thin hydrostatic air layer is formed on a sliding surface of the air hydrostatic bearing 33; thereby, the table main body 31 is rotatably supported with a high degree of accuracy in a non-contact state.

The drive motor 34 is connected to the controller 61 via wiring that passes through the measuring device main body 10. The controller 61 is connected to the control device 60, supplies drive electric power based on control by the control device 60, and causes the drive motor 34 to rotate at a predetermined rotation speed.

As shown in FIG. 2, the anti-vibration table 40 includes a bottom surface member 41 installed on the base 9; a top surface member 42 supporting the measuring device main body 10; and a plurality of gas springs 43 provided to the bottom surface member 41 and supporting the top surface member 42. The gas springs 43 are provided between the top surface member 42 and the bottom surface member 41, for example, at three locations in a horizontal plane encompassing a center of gravity of the measuring device main body 10, which is supported by the top surface member 42.

Pressurized air is supplied from the air supply device 50 to the gas springs 43 by the pipe 54. Due to the pressurized air, the gas springs 43 are inflated between the bottom surface member 41 and the top surface member 42, and can absorb vibration from the bottom surface member 41 while supporting the load of the top surface member 42 and can block the vibration from being transmitted to the top surface member 42.

Figure 3:
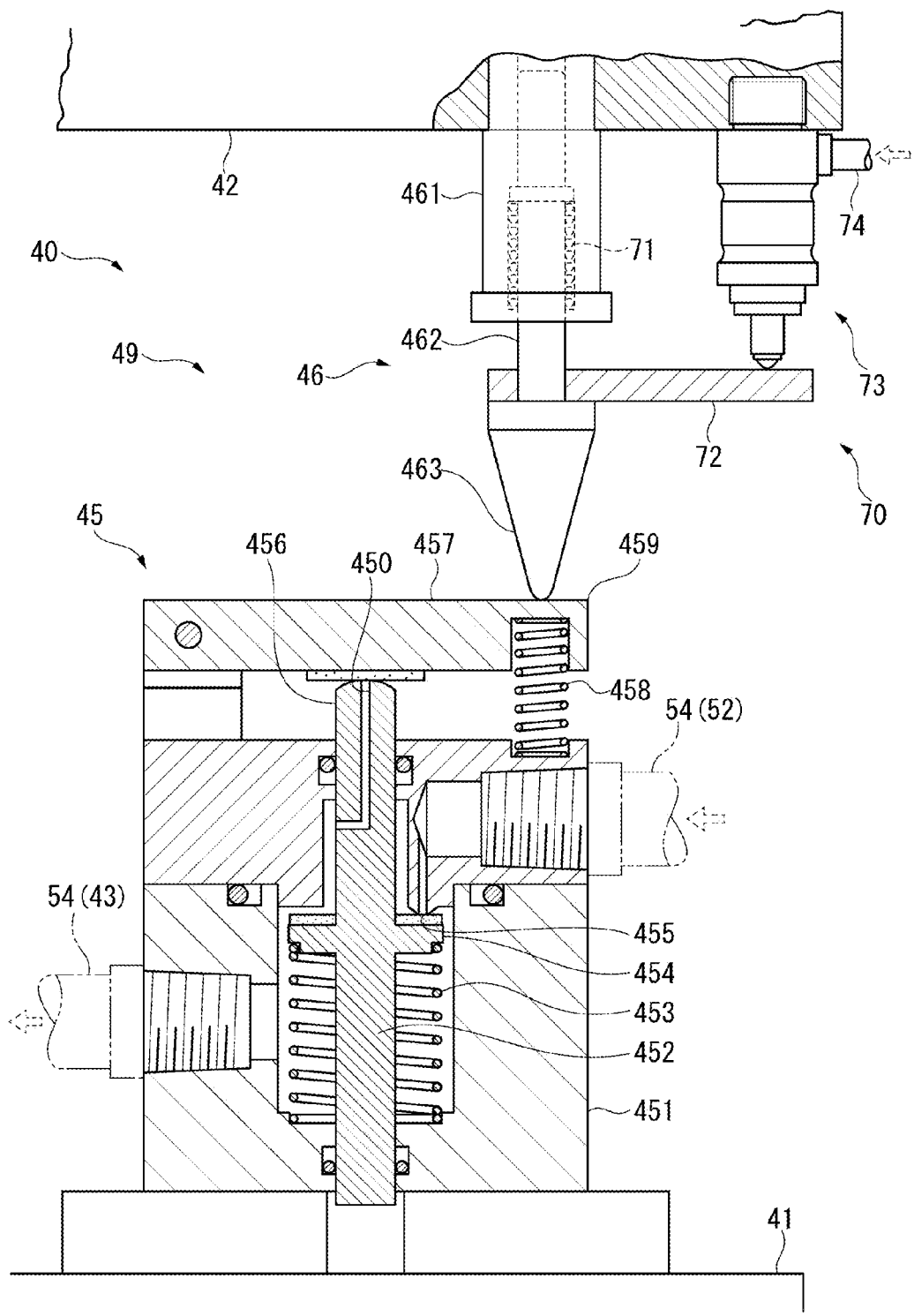
FIG. 3 is a cross-sectional view illustrating a normal state of an adjustment valve according to the first embodiment.
Figure 4:
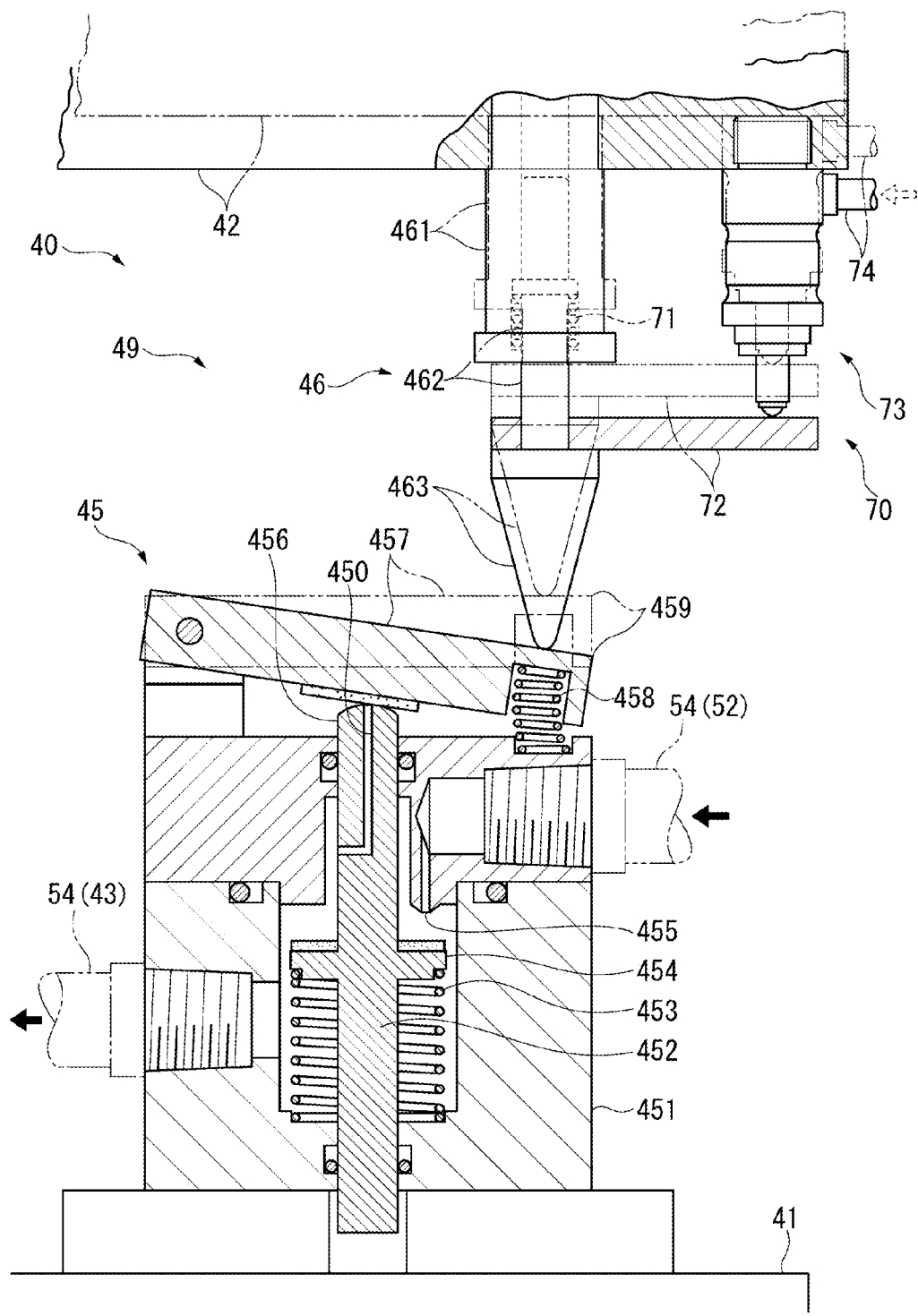
FIG. 4 is a cross-sectional view illustrating a lowered state of the adjustment valve according to the first embodiment.
Figure 5:
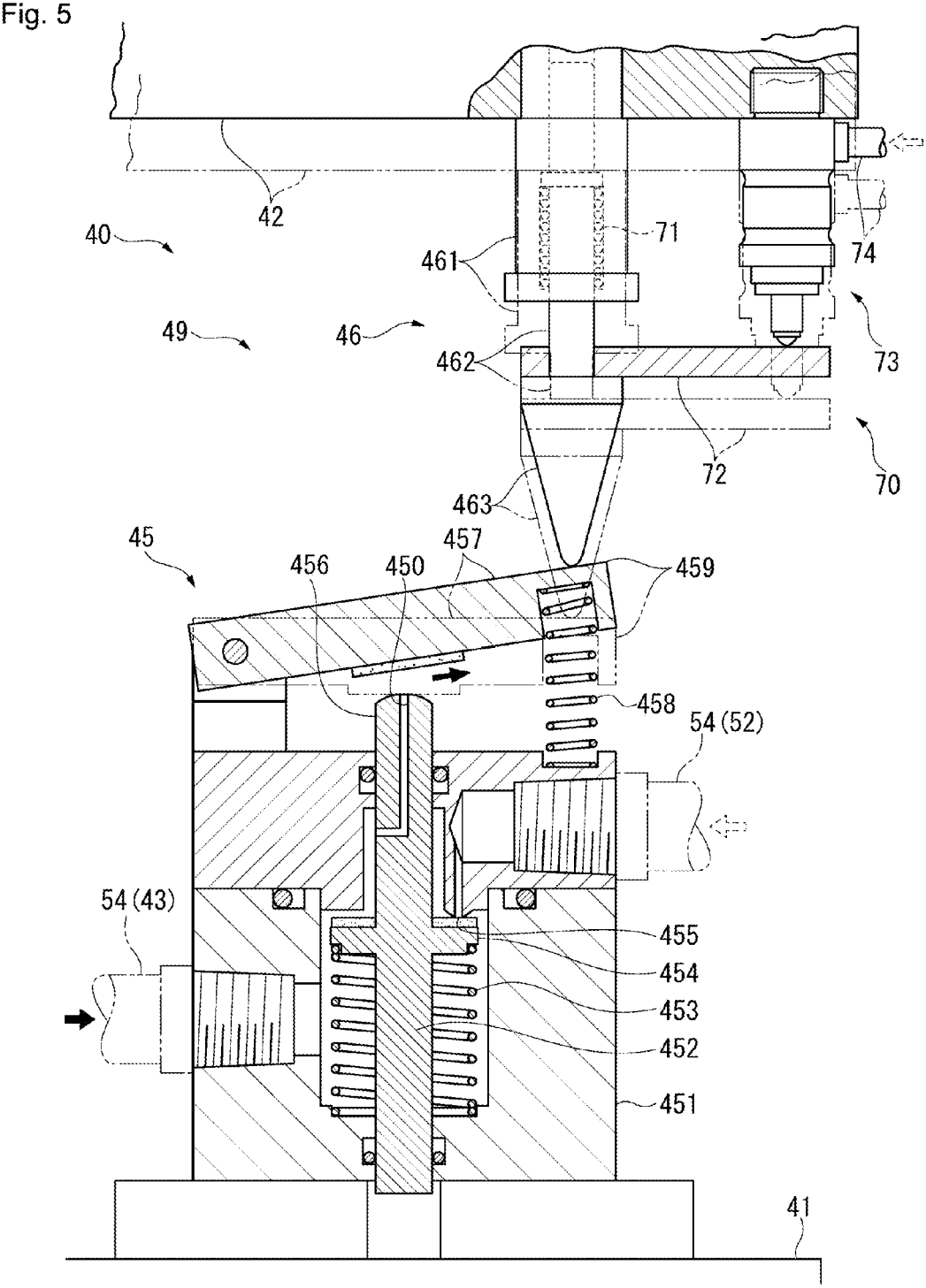
FIG. 5 is a cross-sectional view illustrating a raised state of the adjustment valve according to the first embodiment.

The anti-vibration table 40 according to the present embodiment includes a tilt adjustment mechanism 49 (also referred to as an "adjuster"). As the tilt adjustment mechanism 49, adjustment valves 45 connected to each of the gas springs 43 are installed on the bottom surface member 41, the adjustment valves 45 adding pressurized air from the pipe 54 to the gas springs 43 when the gas springs 43 have been compressed and exhausting pressurized air from the gas springs 43 when the gas springs 43 have been extended; and an operation unit 46 forcibly opening and closing the adjustment valve 45 is provided to each adjustment valve 45 on the top surface member 42. FIGS. 3 to 5 illustrate the adjustment valves 45 and the operation units 46 in an expanded view.

The adjustment valve 45 includes a case 451 fixated to the bottom surface member 41 and a displacement member 452 capable of vertical displacement within the case 451. In the displacement member 452, a flange 454 is biased upward by a coil spring 453. A rocking member 457 is installed on a top portion of the case 451, and a top end 456 of the displacement member 452 is in contact with a bottom surface of the rocking member 457. In the rocking member 457, a rocking end 459 (end portion on an opposite side from the rotation axis) is continuously biased upward by the coil spring 458.

The pipe 54 running to the filter regulator 52 of the air supply device 50 and the pipe 54 running to the gas spring 43 are connected by the case 451, and this pair of pipes 54 communicate with each other via a port 455 within the case 451. When the displacement member 452 is at an upper lift limit, the flange 454 seals the port 455 through which the pair of pipes 54 communicate. In this state, the supply of pressurized air from the pipe 54 to the gas spring 43 is blocked.

Meanwhile, when the rocking end 459 of the rocking member 457 is pressed down by an outside force, the displacement member 452 and the flange 454 are lowered, and thus the port 455 is opened. In this state, the pressurized air from the filter regulator 52 is supplied to the gas spring 43 via the pipe 54. Accordingly, although the adjustment valve 45 typically blocks the pipe 54, the pipe 54 can be opened by pressing the rocking end 459 of the rocking member 457 down.

The operation unit 46 includes a bush 461 fixated to the top surface member 42; a stem 462 inserted through the bush 461 so as to be coaxial with the bush 461; and a cap 463 fixated to a bottom end of the stem 462. The cap 463 is set above the rocking end 459 of the rocking member 457 and, when the top surface member 42 approaches the bottom surface member 41, the rocking end 459 is pressed and supply of pressurized air to the gas spring 43 is performed (see FIG. 7).

As shown in FIG. 2, the gas spring 43, adjustment valve 45, and operation unit 46 are each provided in a plurality of locations on the top surface member 42 and bottom surface member 41, respectively. In this example, when the center of gravity of the work piece 3 placed on the table 2 is biased with respect to the center of the table 2, the load of various portions of the top surface member 42 is also biased, and the greater the load, the more the gas springs 43 compress, whereas the lighter the load, the more the gas springs 43 stretch out. As a result, the top surface member 42 is oblique with respect to the bottom surface member 41, and the two members are no longer parallel to each other.

In addition, when any location on the top surface member 42 descends or rises in association with the tilt, pressurized air is added to or exhausted from the gas spring 43 by the adjustment valve 45 connected to the gas spring 43 at that location, and the inclination is automatically corrected.

As shown in FIG. 4, when the gas spring 43 installed at any location on the top surface member 42 contracts and the operation unit 46 at that same location descends, the rocking member 457 of the adjustment valve 45 is pressed by the operation unit 46 at that same location and the port 455 is opened. In addition, the pressurized air from the pipe 54 is added to the gas spring 43, the gas spring 43 stretches, and the location of the top surface member 42 that had descended is lifted back up.

As shown in FIG. 5, when the gas spring 43 installed at any location on the top surface member 42 stretches and the operation unit 46 at that same location rises, pressure on the rocking member 457 of the adjustment valve 45 is released by the operation unit 46 at that same location, the port 450 is opened, and pressurized air on the interior of the gas spring 43 is exhausted. Accordingly, the gas spring 43 contracts and the location of the top surface member 42 that had risen descends again.

Through such operation of the plurality of gas springs 43 and each adjustment valve 45, the inclination of the top surface member 42 can be automatically resolved and the top surface member 42 can be kept constantly in parallel with the bottom surface member 41. The tilt adjustment mechanism 49 of the anti-vibration table 40 is configured by these components.

Figure 6:
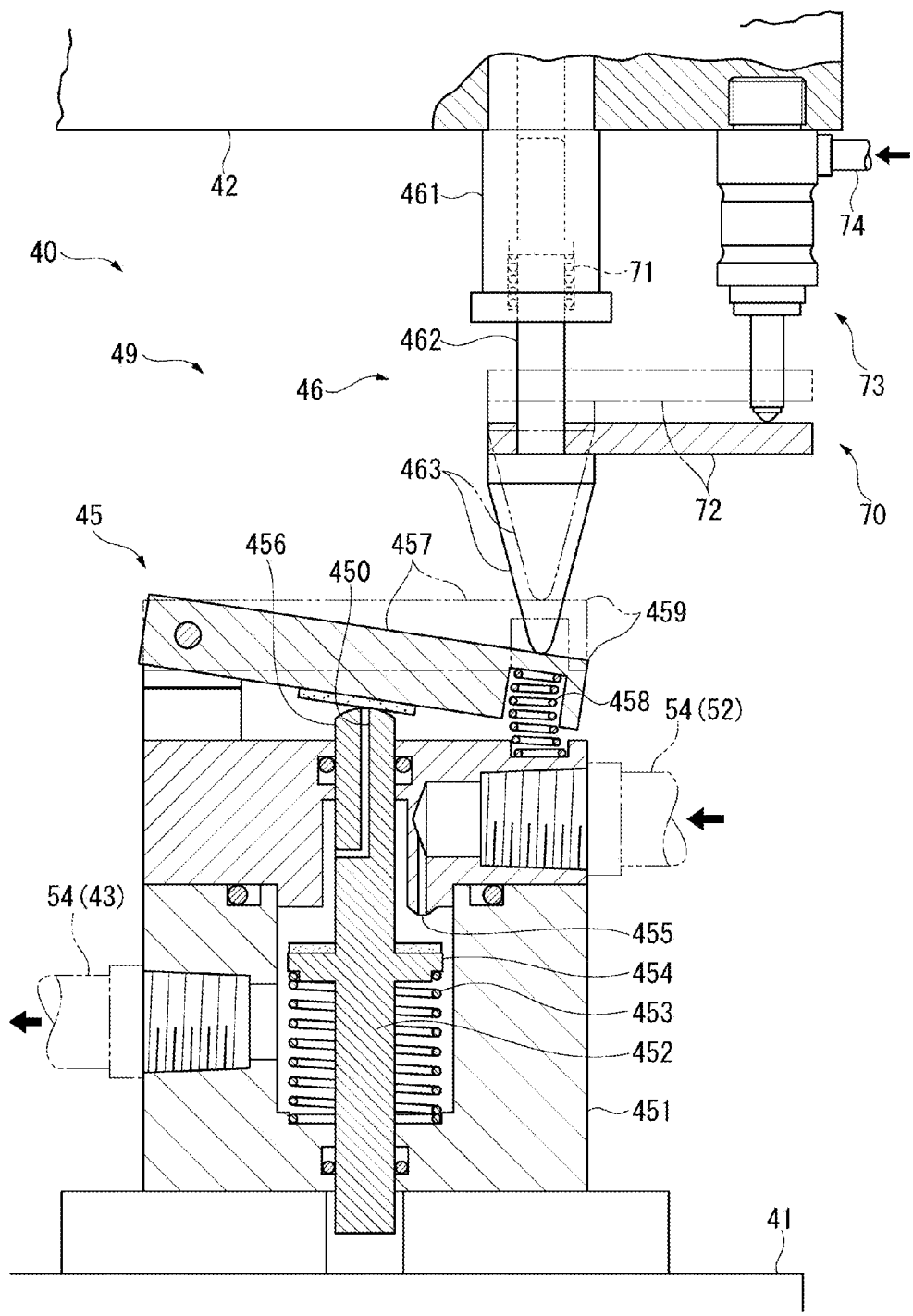
FIG. 6 is a cross-sectional view illustrating a forced open state of the adjustment valve according to the first embodiment.

In the present embodiment, the lifting/lowering device of the present invention is configured using the tilt adjustment mechanism 49 of the anti-vibration table 40 described above. As shown in FIGS. 2, 3, and 6, an additional valve open/close mechanism 70, pipe 76, and control valve 77 are provided to the air supply device 50 and operation unit 46 of the present embodiment in order to utilize the tilt adjustment mechanism 49 as the lifting/lowering device.

In the operation unit 46, the stem 462 is housed so as to be capable of freely sliding in an axis direction with respect to the bush 461, the stem 462 is biased by a coil spring 71 in a direction so as to be accommodated in the bush 461, and the cap 463 is maintained in a state close to the top surface member 42. A lever 72 is connected to a portion connecting the stem 462 and the cap 463.

An air cylinder 73 operating with pressurized air is installed at a position on the top surface member 42 corresponding to a forefront end of the lever 72. A pipe 74 is connected to the air cylinder 73, and by supplying pressurized air from the pipe 74, a forefront end of the air cylinder 73 advances to press down the lever 72, and the cap 463 can be advanced downward. In this way, with the operation unit 46 of the present embodiment, the cap 463 is advanced downward by the supply of pressurized air from the pipe 74, and accordingly the adjustment valve 45 can be opened regardless of the inclination of the top surface member 42.

In the air supply device 50 shown in FIG. 2, the pipe 74, which runs to the air cylinder 73 provided to each operation unit 46, branches off from the pipe 54 supplying pressurized air to the gas spring 43. A control valve 75 controlling flow of the pressurized air is provided partway along the pipe 74. Moreover, an exhaust pipe 76 separate from the pipe 54 and a control valve 77 opening and closing the exhaust pipe 76 are provided to each gas spring 43. The pipe 76 has a larger diameter than that of the pipe 54, and can exhaust gas at a higher efficiency than during the supply of pressurized air.

The control valves 75 and 77 are each connected to the control device 60 via the controller 61, and are controlled in accordance with an operation program executed by the control device 60. In this example, the control valve 75 is opened and all of the adjustment valves 45 between the top surface member 42 and the bottom surface member 41 are opened, thereby uniformly stretching out all of the gas springs 43. Accordingly, the top surface member 42 can be raised relative to the bottom surface member 41 (see FIG. 6).

On the other hand, the control valve 77 is opened and all of the gas springs 43 are exhausted via the pipes 76, thereby uniformly compressing all of the gas springs 43. Accordingly, the top surface member 42 can be lowered relative to the bottom surface member 41 (see FIG. 3). In this way, in the present embodiment, by including the valve open/close mechanism 70 in addition to the air supply device 50 and the operation unit 46, the tilt adjustment mechanism 49 can be utilized as the lifting/lowering device.

In FIGS. 7 to 10, a roundness measuring device 1R is shown that includes an existing anti-vibration table 40R capable of tilt adjustment. The roundness measuring device 1R has a basic configuration similar to that of the roundness measuring device 1 according to the present embodiment, described above (see FIGS. 1 to 4). Specifically, in the roundness measuring device 1R, the measuring device main body 10, measuring apparatus 20, table apparatus 30, and control device 60 are similar to those of the roundness measuring device 1, described above.

Meanwhile, the anti-vibration table 40R and air supply device 50R of the roundness measuring device 1R shown in FIGS. 7 to 10 have a configuration that partially differs from that of the anti-vibration table 40 and air supply device 50 of the roundness measuring device 1 shown in FIGS. 2 to 6.

Figure 7:
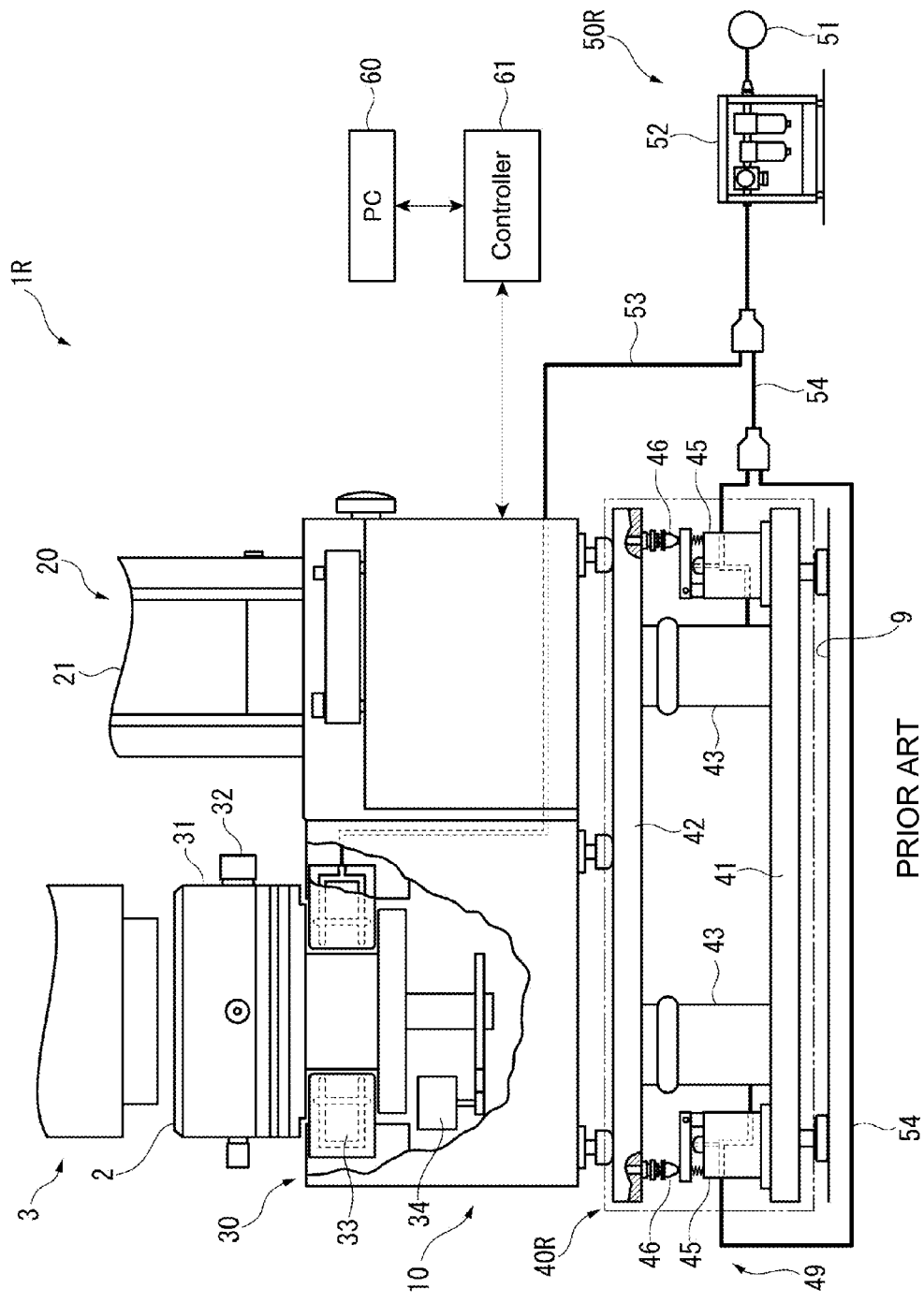
FIG. 7 illustrates a conventional anti-vibration table on which the first embodiment is predicated.
Figure 8:
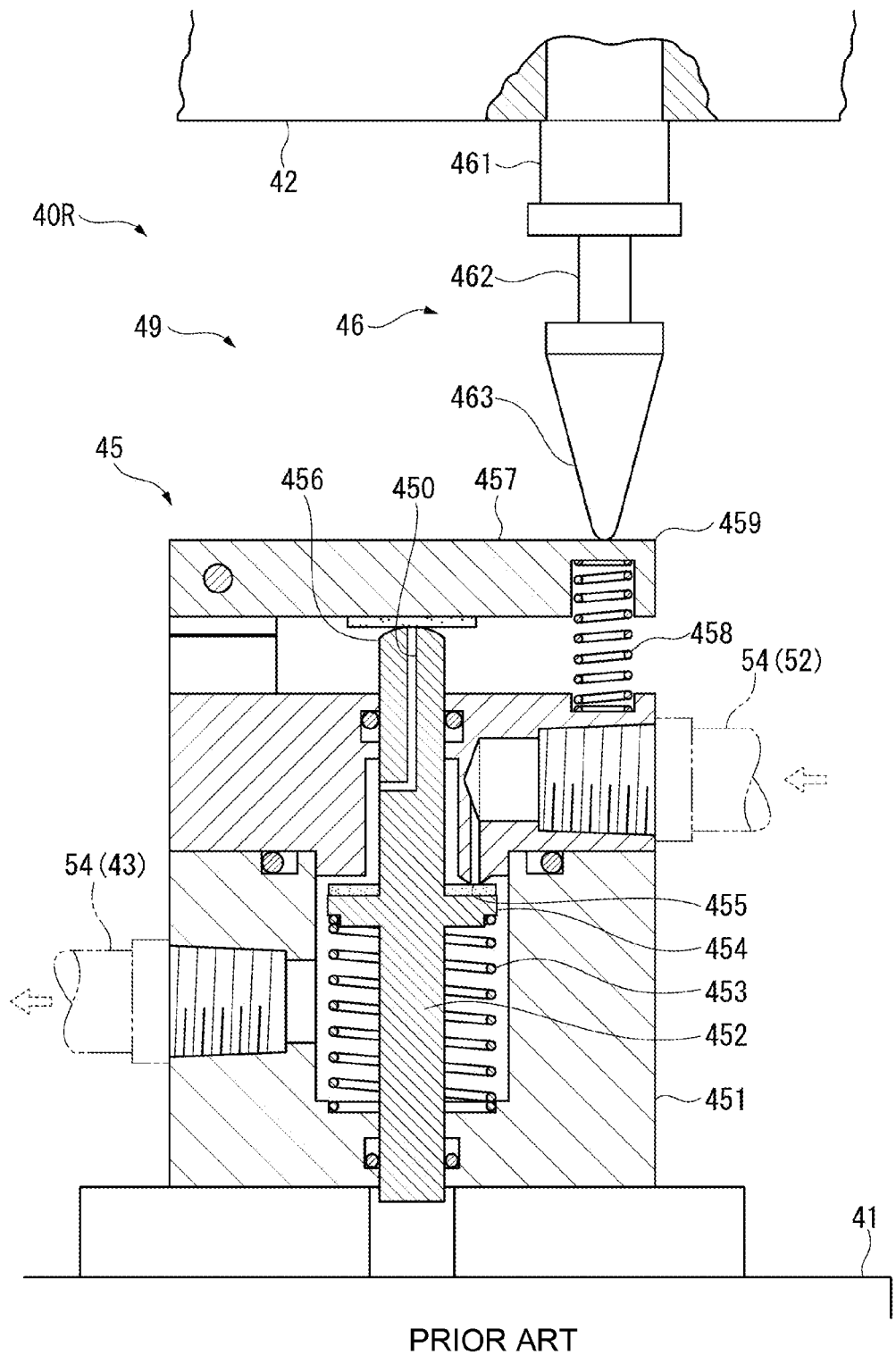
FIG. 8 is a cross-sectional view illustrating an adjustment valve of the conventional anti-vibration table.

In FIG. 7, the anti-vibration table 40R includes the bottom surface member 41, top surface member 42, and gas springs 43 similar to the anti-vibration table 40 of the above-described embodiment (see FIGS. 2 to 6) as the tilt adjustment mechanism 49. However, although the adjustment valves 45 of the tilt adjustment mechanism 49 of the anti-vibration table 40R are similar to those of the present embodiment, the operation unit 46 differs; the stem 462 is fixated to the bush 461; and the coil spring 71, lever 72, air cylinder 73, and pipe 74 of the present embodiment (see FIGS. 3 to 6) are not provided.

In FIG. 7, the air supply device 50R includes a pressurized air source 51, filter regulator 52, pipe 53, and pipe 54 (see FIG. 2) similar to those of the air supply device 50 of the above-described embodiment (see FIG. 2). However, the pipe 74 that would run to the operation unit 46 of the anti-vibration table 40R and the control valve 75 that would interrupt the pipe 74 (see FIG. 2) are not provided.

In the roundness measuring device 1R having the anti-vibration table 40R and the air supply device 50R, a similar tilt adjustment effect to that described above for the anti-vibration table 40 (shown in FIGS. 2 to 6) is obtained by the tilt adjustment mechanism 49 of the anti-vibration table 40R.

Figure 9:
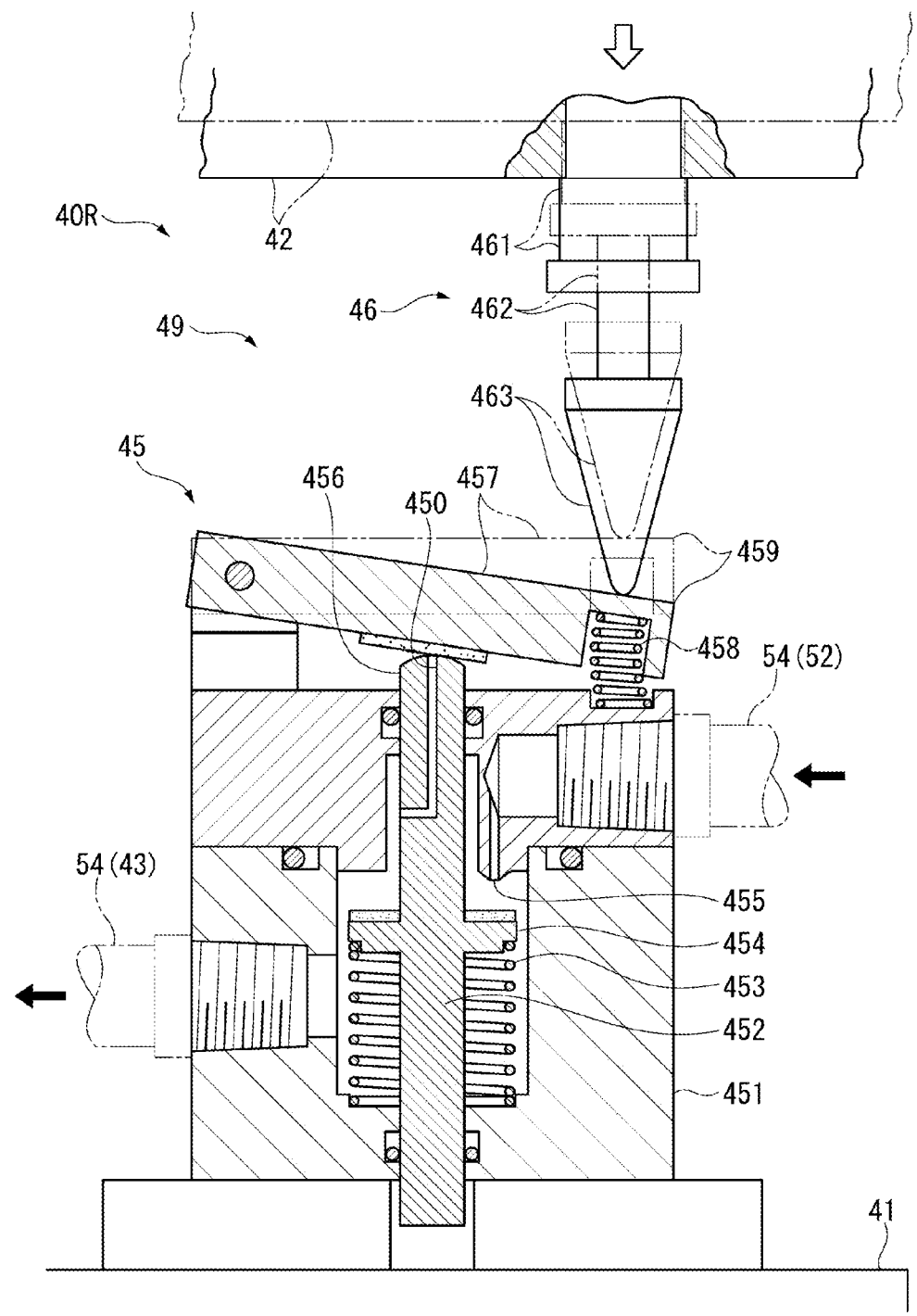
FIG. 9 is a cross-sectional view illustrating a lowered state of the adjustment valve of the conventional anti-vibration table.

As shown in FIG. 9, when any location on the top surface member 42 descends, the gas spring 43 installed at that location compresses. At that point, the operation unit 46 at that same location descends, and therefore the rocking member 457 of the adjustment valve 45 is pressed by the operation unit 46 and the port 455 is opened. In addition, the pressurized air from the pipe 54 is added to the gas spring 43 and the gas spring 43 stretches, and thus the location of the top surface member 42 that had descended is lifted back up.

Figure 10:
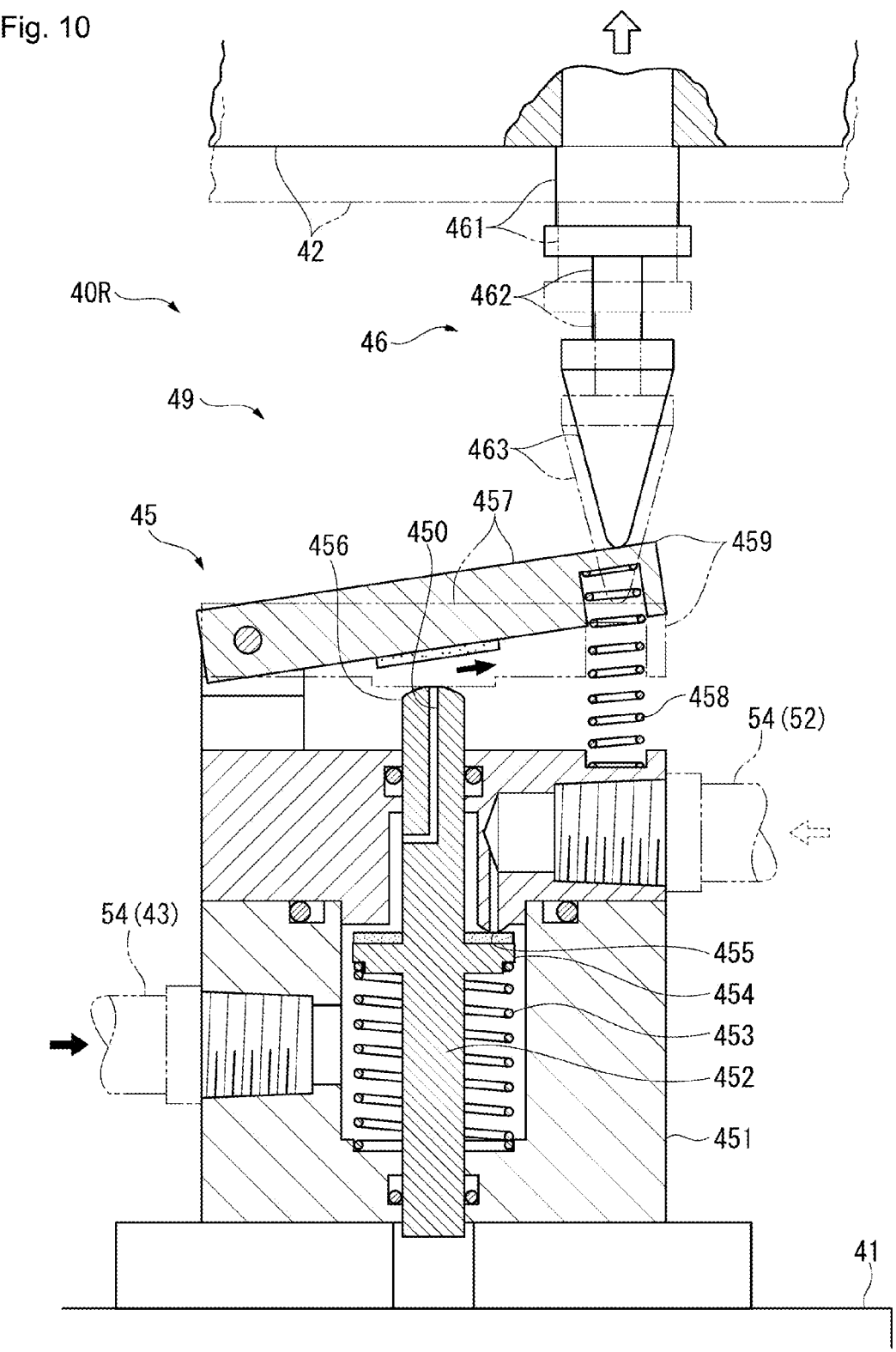
FIG. 10 is a cross-sectional view illustrating a raised state of the adjustment valve of the conventional anti-vibration table.

As shown in FIG. 10, when any location on the top surface member 42 rises, the gas spring 43 installed at that location stretches. At that point, the operation unit 46 at that same location rises, and therefore pressure on the rocking member 457 of the adjustment valve 45 is released by the operation unit 46, the port 450 is opened, and pressurized air on the interior of the gas spring 43 is exhausted. Accordingly, the gas spring 43 contracts and the location on the top surface member 42 that had risen descends again.

Through such operation of the plurality of gas springs 43 and each adjustment valve 45, the inclination of the top surface member 42 can be automatically corrected and the top surface member 42 can be restored to a horizontal state.

Returning to FIGS. 2 to 6, the anti-vibration table 40 according to the present embodiment adds an additional valve open/close mechanism 70 (coil spring 71, lever 72, air cylinder 73, pipe 74, and control valve 75), the exhaust pipe 76, and the control valve 77 to the existing anti-vibration table 40R shown in FIGS. 7 to 10. In other words, through the addition of simple configurations (the valve open/close mechanism 70, the pipe 76, and the control valve 77) to the existing anti-vibration table 40R described above, the anti-vibration table 40 of the present embodiment can achieve the effect of the lifting/lowering device of the present invention in addition to the tilt adjustment effect obtained by the tilt adjustment mechanism 49.

The valve open/close mechanism 70, pipe 76, and control valve 77 can utilize common components, for example, and focus can be placed on small-scale improvements. Accordingly, the existing anti-vibration table 40R can be readily remodeled into the anti-vibration table 40 according to the present embodiment without complicating the configuration of the device.

In the present embodiment, the lifting/lowering mechanism of the anti-vibration table 40 described above is utilized, and the work piece 3 having a significant weight is placed on the roundness measuring device 1. When placing the work piece 3 on the table 2, based on the method of placing the work piece on the measuring device according to the present invention, the work piece 3 is suspended by the crane 4 (retention device) and the table 2 is lifted/lowered to prevent a collision between the work piece 3 and the table 2.

In order to do this, in the present embodiment, the control valves 75 and 77 of the air supply device 50 are controlled by the control device 60 to open and close, and the adjustment valve 45 is forcibly opened and closed by the valve open/close mechanism 70; alternatively, the pipe 76 and the control valve 77 forcibly exhaust air from the gas spring 43. Thereby, the table 2 is lifted and lowered using the lifting/lowering device (operation unit 46, adjustment valve 45, and gas spring 43), which utilizes the tilt adjustment mechanism 49 of the anti-vibration table 40. Specifically, the action shown in FIG. 12 is performed via the operations shown in FIG. 11.

Figure 11:
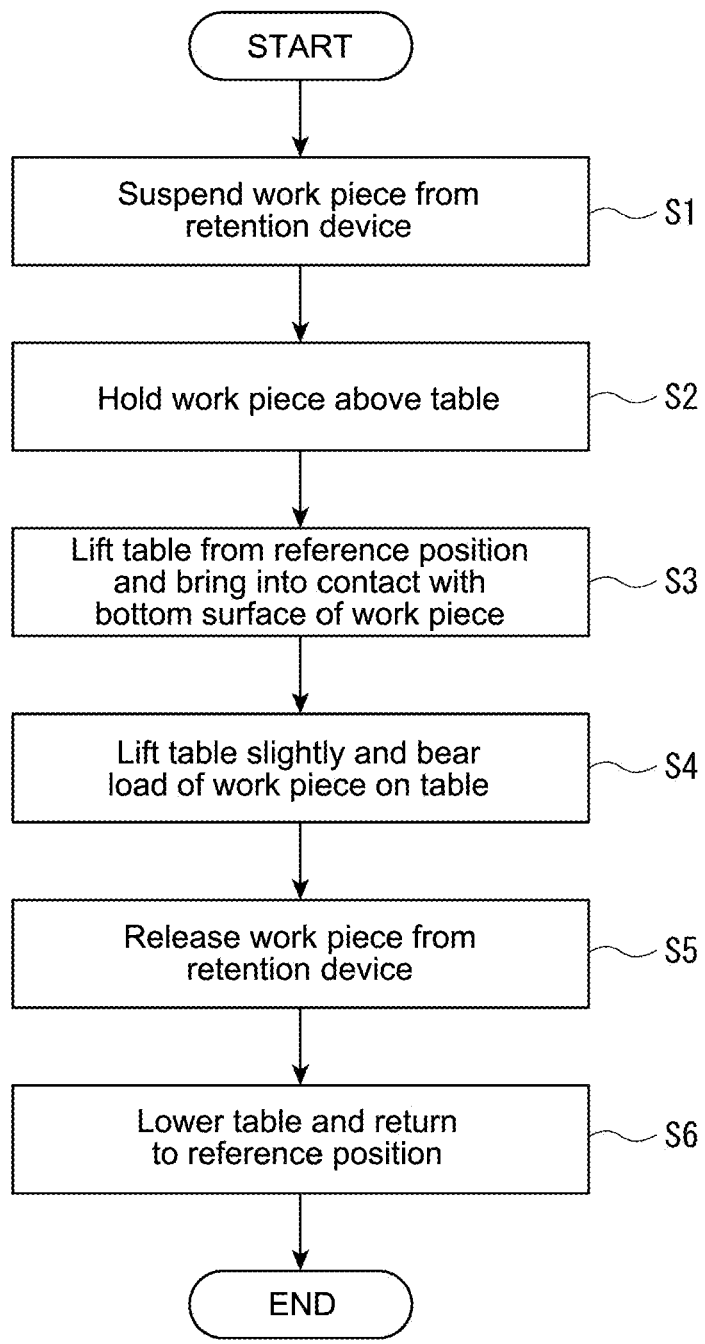
FIG. 11 is a flowchart illustrating operations in the first embodiment.
Figures 12A, 12B, 12C:
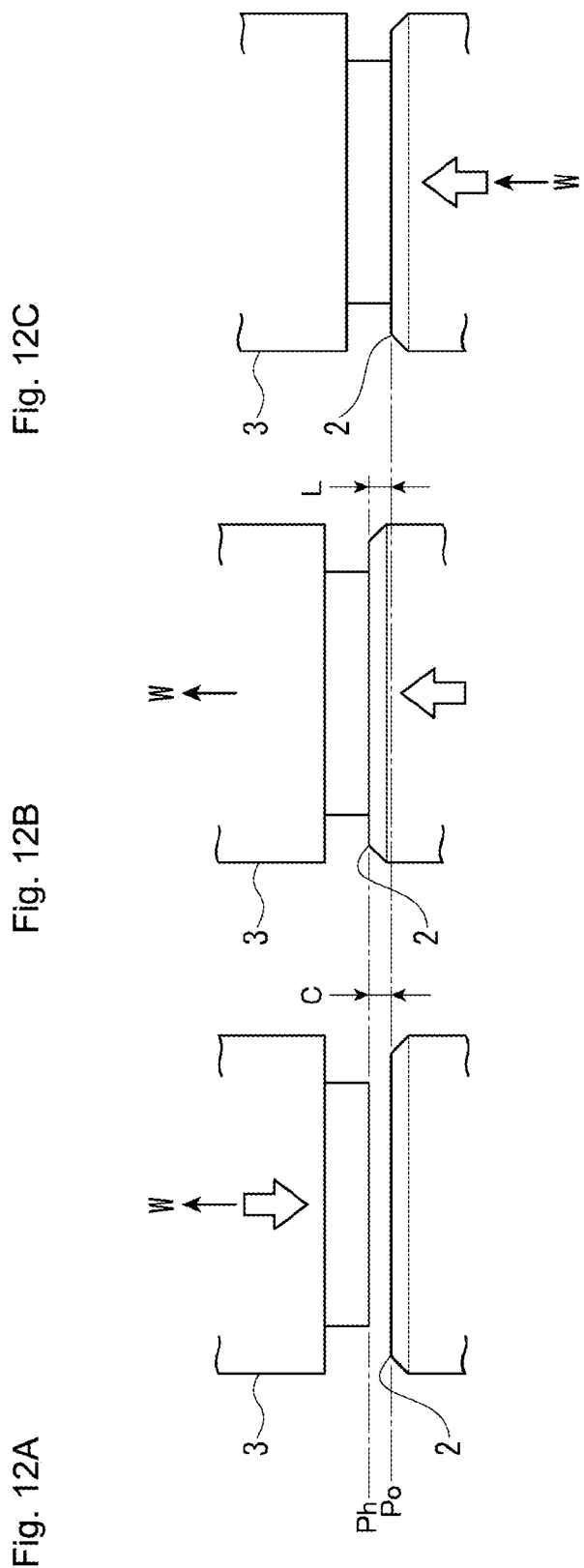
FIGS. 12A to 12C are schematic views illustrating operations in the first embodiment.

First, the work piece 3 is suspended by the crane 4 (retention device, see FIG. 1) (step S1 in FIG. 11), and the suspended work piece 3 is held above the table 2 (step S2 in FIG. 11, see FIG. 12A). At this point, a height of the top surface of the table 2 is defined as a reference position Po and a height of a bottom surface of the work piece 3 is defined as a holding position Ph. A difference between the reference position Po and the holding position Ph, i.e., a gap between the top surface of the table 2 and the bottom surface of the work piece 3, is defined as a distance C. The holding position Ph is set to be lower than the upper lift limit of the lifting/lowering device using the tilt adjustment mechanism 49 of the anti-vibration table 40. In this state, the load of the work piece 3 is borne by the crane 4.

Next, the table 2 is lifted from the reference position Po by the lifting/lowering device, and is brought into contact with the bottom surface of the work piece 3 (step S3 in FIG. 11, see FIG. 12B). At this point, a distance L by which the table 2 is lifted is defined as equal to the distance C. During this operation, an amount of displacement of the rising table 2 is monitored and is preferably configured such that, by lifting the table 2 at a sufficiently low speed when making contact with the work piece 3, even when the table 2 is lifted at a high speed before approaching the work piece 3, no collision occurs when contact is made.

Next, the table 2, which is in contact with the bottom surface of the work piece 3, is lifted slightly and the load of the work piece 3 is borne by the table 2 (step S4 in FIG. 11, see FIG. 12B). When the load of the work piece 3 is borne by the table 2, the load burden from the crane 4 is removed. At this point, the crane 4 is moved away and the hold on the work piece 3 is released (step S5 in FIG. 11, see FIG. 12B). Accordingly, the work piece 3 can be lowered from the holding position Ph.

In the state where the hold on the work piece 3 has been released, the table 2 is lowered and returned to the reference position Po (step S6 in FIG. 11, see FIG. 12C). In this way, a state can be achieved in which the work piece 3 rests on the table 2 at the reference position Po. Also, no collision occurs between the table 2 and the work piece 3 during placement of the work piece 3.

The following advantages can be achieved according to the present embodiment. In the present embodiment, by lifting the table 2 relative to the work piece 3, which is held above the table 2, contact can be made between the work piece 3 and the table 2 while the work piece 3 remains in a state held by the crane 4 (retention device).

In addition, in a state where contact has been made, the load is borne on the table 2 and the load burden on the crane 4 is removed; accordingly, the work piece 3 can be placed on the table 2. In other words, an operation to shift the load of the work piece 3 from the crane 4 (retention device) to the table 2 is performed in a state where the work piece 3 and the table 2 are already in contact; therefore, circumstances can be configured such that a collision does not occur.

Moreover, in the present embodiment, a conventional crane 4 can be used as the retention device holding the work piece 3, and the lifting/lowering device lifting and lowering the table 2 can also have a simple configuration in which an additional valve open/close mechanism 70, pipe 76, and control valve 77 are added to an existing tilt adjustment mechanism 49 of the anti-vibration table 40.

In the present embodiment, in a state where the work piece 3 and the table 2 are in contact, the load burden of the work piece 3 can be transferred from the crane 4 (retention device) to the table 2 by an operation that lifts the table 2 slightly (step S4 in FIG. 11). Therefore, when the load of the work piece 3 is borne by the table 2, there is no need to move the work piece 3 while holding the work piece 3 above the table 2. In particular, in a case where the work piece 3 has a large mass, fine operation of the crane 4 is required in order to lower the work piece 3; however, according to the present embodiment, the work piece 3 is not moved, and therefore the need for such fine operation, which requires skill, can be obviated.

In the present embodiment, as shown in FIGS. 11 and 12A to 12C, the table 2 is lifted from the reference position Po (for example, measurement position where measurement is conducted with the measuring device), is brought into contact with the work piece 3, and after receiving the load of the work piece 3, the work piece 3 and table 2 are returned to the reference position Po. Therefore, transfer of the work piece 3 can be performed at the holding position Ph, which is higher than the reference position Po, and interference with surrounding equipment or the like during transport of the work piece 3 can be avoided from the start.

Second Embodiment

FIGS. 13 through 15D illustrate a second embodiment according to the present invention. The present embodiment executes a different procedure from that of the first embodiment, described above, using the roundness measuring device 1 similar to that of the first embodiment, described above.

Figure 13:
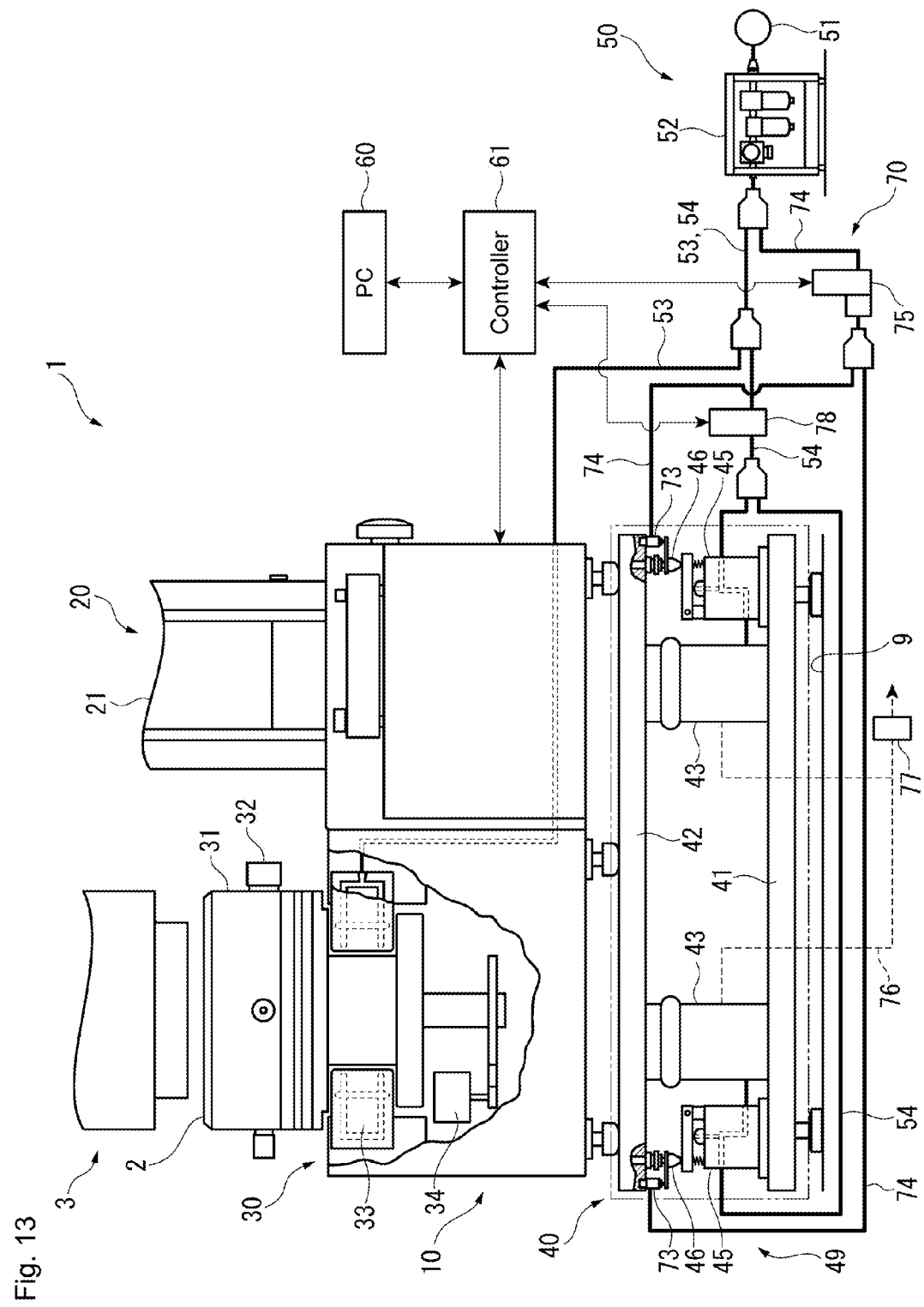
FIG. 13 illustrates a control system according to a second embodiment of the present invention.

In FIG. 13, the roundness measuring device 1 according to the present embodiment has a configuration similar to that of FIG. 2, described above. However, a control valve 78 capable of being operated by the control device 60 is installed at a midway portion of the pipe 54. When the control valve 77 is open and pressurized air is forcibly exhausted from the gas springs 43, the control valve 78 is closed and the supply of pressurized air from the adjustment valves 45 to the gas springs 43 is temporarily stopped.

During an operation described below (step S12 in FIG. 14) when the table 2 is lowered from the reference position Po (see two-dot dashed line in FIG. 15A) to a standby position Pr (see solid line in FIG. 15A), this configuration prevents the adjustment valves 45 from opening and pressurized gas from traveling from the gas springs 43 to the pipe 76. Hereafter, a description is given of the operations (see FIG. 14) and actions (see FIGS. 15A to 15D) in the present embodiment.

Figure 14:
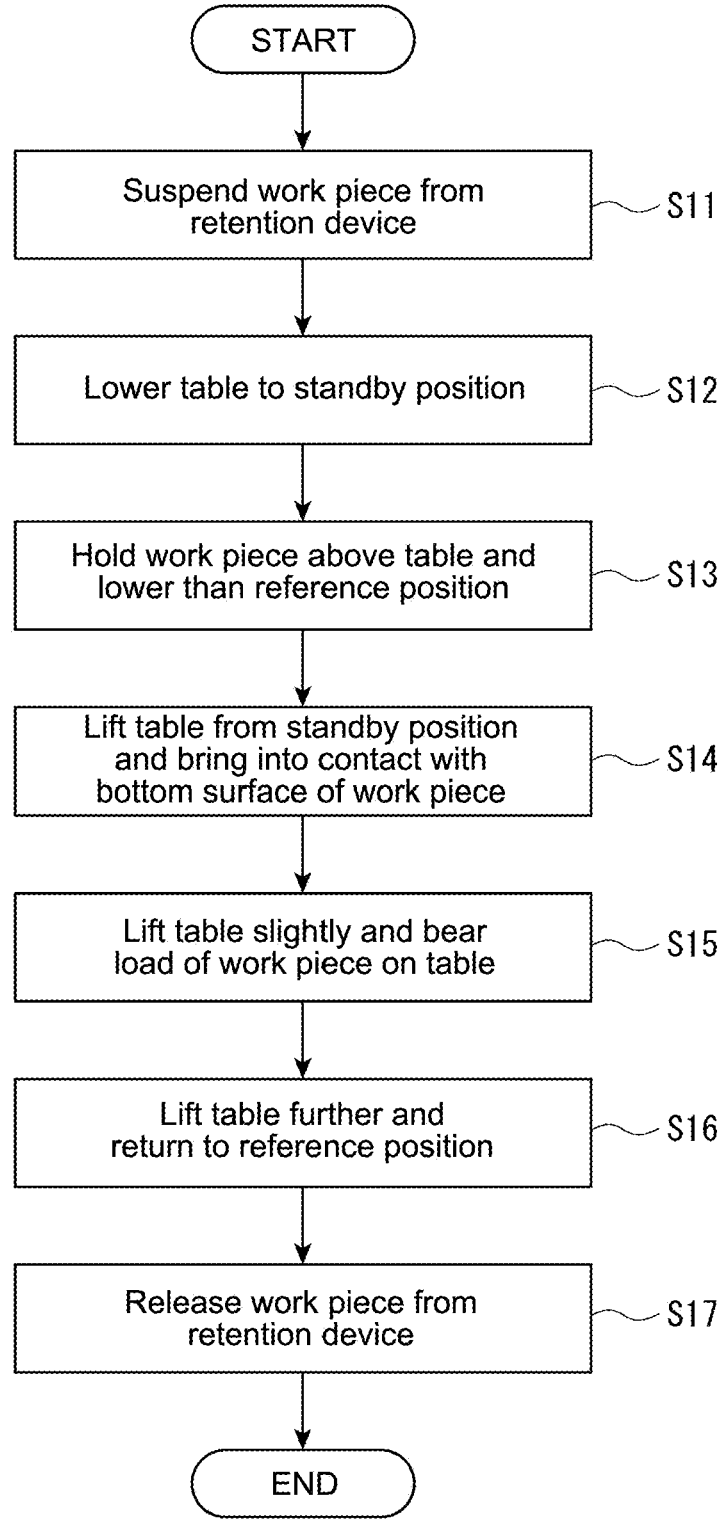
FIG. 14 is a flowchart illustrating operations in the second embodiment.

First, the work piece 3 is suspended over the table 2 (higher than the reference position Po of the table 2) by the crane 4 (retention device, see FIG. 1) (step S11 in FIG. 14). Next, the table 2 is lowered from the reference position Po (see two-dot dashed line in FIG. 15A) to the standby position Pr (see solid line in FIG. 15A) (step S12 in FIG. 14). Step S11 and step S12 may also be performed in the opposite order, or may be performed simultaneously, in parallel.

Next, the suspended work piece 3 is lowered and is held such that the bottom surface of the work piece 3 is in the holding position Ph, which is lower than the reference position Po (step S13 in FIG. 14, see FIG. 15A). In this state, the load of the work piece 3 is borne by the crane 4.

Next, the table 2 is lifted from the standby position Pr by the lifting/lowering device, and is brought into contact with the bottom surface of the work piece 3, which is held at the holding position Ph (step S14 in FIG. 14, see FIG. 15B). At this point, the distance L by which the table 2 is lifted is defined as equal to the distance C, which is the difference between the standby position Pr and the holding position Ph. During this operation, the amount of displacement of the rising table 2 is monitored and is preferably configured such that, by lifting the table 2 at a sufficiently low speed when making contact with the work piece 3, even when the table 2 is lifted at a high speed before approaching the work piece 3, no collision occurs when contact is made.

Next, the table 2, which is in contact with the bottom surface of the work piece 3, is lifted slightly and the load of the work piece 3 is borne by the table 2 (step S15 in FIG. 14, see FIG. 15B). When the load of the work piece 3 is borne by the table 2, the load burden from the crane 4 is removed.

In the state where the hold on the work piece 3 has been released, the table 2 is lifted further and returned to the reference position Po from the holding position Ph (step S16 in FIG. 14, see FIG. 15D). In this state, the crane 4 is moved away and the hold on the work piece 3 is released (step S17 in FIG. 14). Step S16 and step S17 may also be performed in the opposite order, or may be performed simultaneously, in parallel. In this way, a state can be achieved in which the work piece 3 rests on the table 2 at the reference position Po. Also, no collision occurs between the table 2 and the work piece 3 during placement of the work piece 3.

The present embodiment can obtain advantages similar to those of the first embodiment, described above. Moreover, in the present embodiment, the table 2 is shunted from the reference position Po (for example, measurement position where measurement is conducted with the measuring device) to the standby position Pr, and transports the work piece 3 in this state. Therefore, the work piece 3 prior to contact can be held in the reference position Po or in the nearby holding position Ph. Accordingly, the amount of displacement of the table 2 to make contact with the work piece 3 and to thereafter return to the reference position Po can be kept to a minimum.

Third Embodiment

Figure 16:
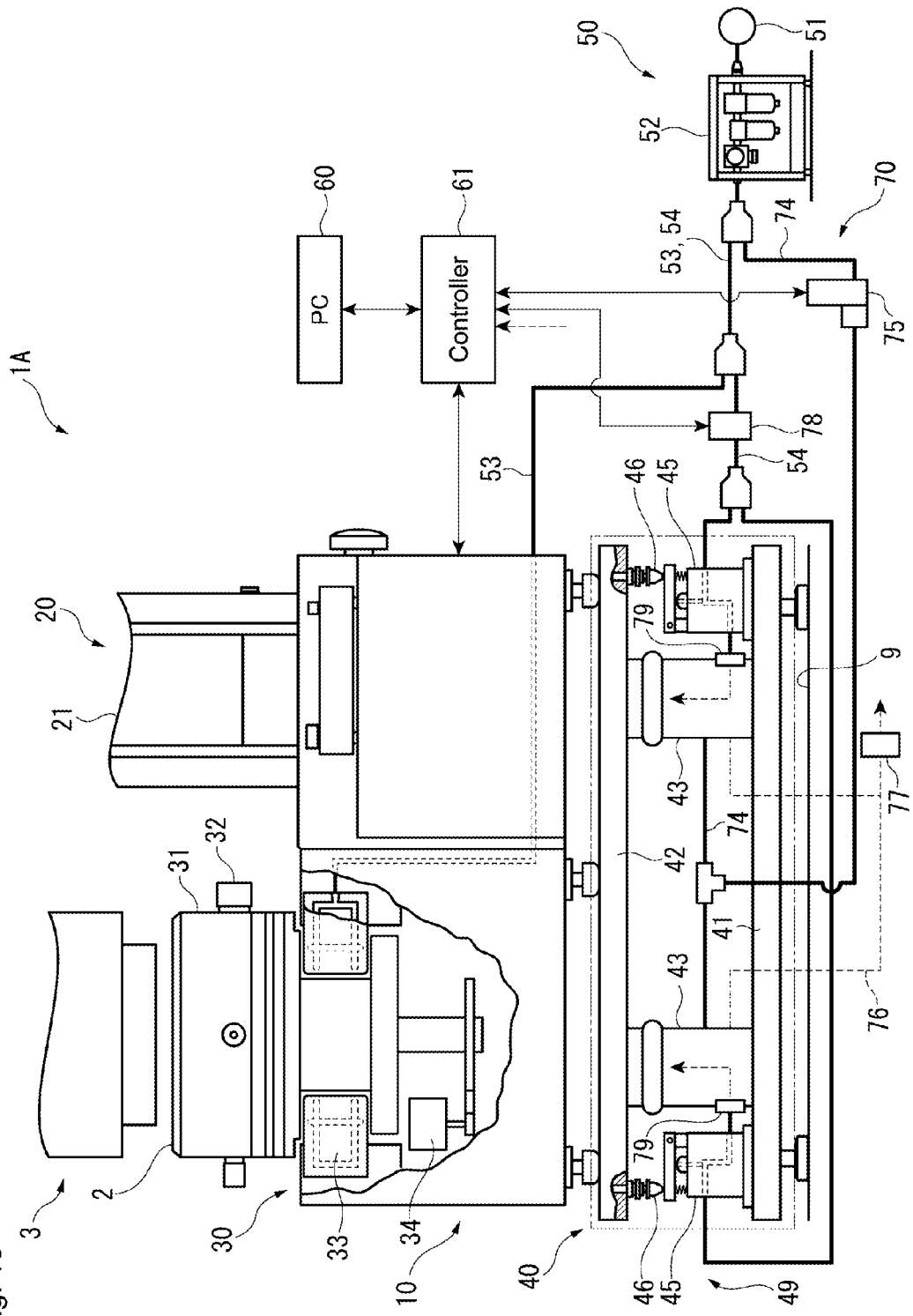
FIG. 16 illustrates a configuration of a third embodiment of the present invention.

FIG. 16 illustrates a third embodiment according to the present invention. In FIG. 16, a roundness measuring device 1A according to the present embodiment has a basic configuration similar to that of the roundness measuring device 1 according to the first embodiment, described above. Accordingly, hereafter, duplicative descriptions of shared configurations are omitted and only those portions that are differentiated are described.

In the first embodiment, described above, the coil spring 71, lever 72, and air cylinder 73 were added to the operation unit 46 of the tilt adjustment mechanism 49 of the anti-vibration table 40 as the valve open/close mechanism 70 (see FIGS. 3 to 6), and the pipe 74 having the control valve 75 provided at a midway portion thereof was connected to the air cylinder 73 (see FIG. 2). In the present embodiment, no components are added to the operation unit 46 of the tilt adjustment mechanism 49 of the anti-vibration table 40. Instead, the pipe 74 branching off from the air supply device 50 (having the control valve 75 provided at a midway portion thereof) is connected to the gas spring 43 of the anti-vibration table 40.

Moreover, the exhaust pipe 76 and the control valve 77 opening and closing the exhaust pipe 76 are provided to each gas spring 43, similar to the first embodiment. The pipe 76 has a larger diameter than that of the pipe 54, and can exhaust gas at a higher efficiency than during the supply of pressurized air.

In this embodiment, the control valves 75 and 77 are opened and closed by the control device 60 and pressurized air is supplied to the gas springs 43 from the pipe 74; thereby, the top surface member 42 of the anti-vibration table 40 and the table 2 can be lifted, or the table 2 can be lowered by exhausting gas from the gas springs 43 using the pipe 76.

In the present embodiment, the table 2 can be lifted and lowered in a manner similar to that of the first embodiment, described above. In addition, when placing the work piece 3 on the table 2, a collision between the table 2 and the work piece 3 can be prevented using operations similar to those of the procedure shown in FIGS. 11 and 12A to 12C (first embodiment) or FIGS. 14 and 15A to 15D (second embodiment). Moreover, a device added to the anti-vibration table 40 to lift and lower the table 2 may simply be the pipes 74 and 76 to the gas springs 43 and the control valves 75 and 77, and therefore the configuration of the device can be greatly simplified.

Fourth Embodiment

Figure 17:
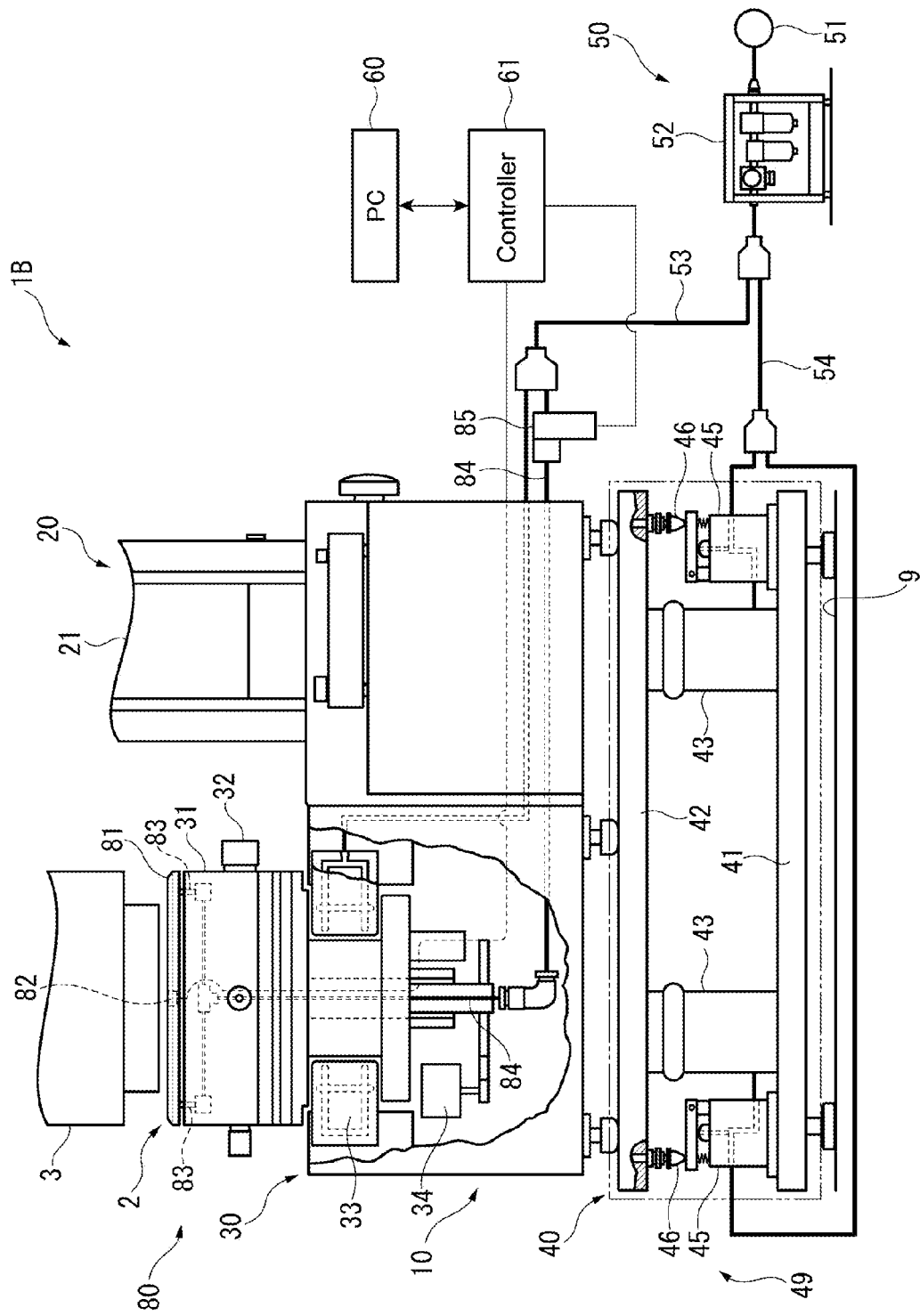
FIG. 17 illustrates a configuration of a fourth embodiment of the present invention.

FIGS. 17 through 20 illustrate a fourth embodiment according to the present invention. In FIG. 17, a roundness measuring device 1B according to the present embodiment has a basic configuration similar to that of the roundness measuring device 1 according to the first embodiment, described above. Accordingly, hereafter, duplicative descriptions of shared configurations are omitted and only those portions that are differentiated are described.

In the first embodiment described above, the lifting/lowering device was configured to lift and lower the table 2 using the tilt adjustment mechanism 49 of the anti-vibration table 40. In the present embodiment, an additional lifting/lowering mechanism 80 is provided between the table 2 and the table apparatus 30, enabling the table 2 to be lifted and lowered relative to the table apparatus 30, thereby configuring the lifting/lowering device. Specific configurations according to the present embodiment are as follows.

In FIG. 17, the table 2 is configured by a disk-shaped table member 81 and can be separated from the table apparatus 30. A plurality of air cylinders 83 capable of advancing upward using pressurized air are installed on the top surface of the table apparatus 30 (in the present embodiment, at three locations at intervals of 120°). The table 2 (table member 81) is supported by the air cylinders 83 and can be lifted and lowered by supplying or blocking pressurized air.

Figure 18:
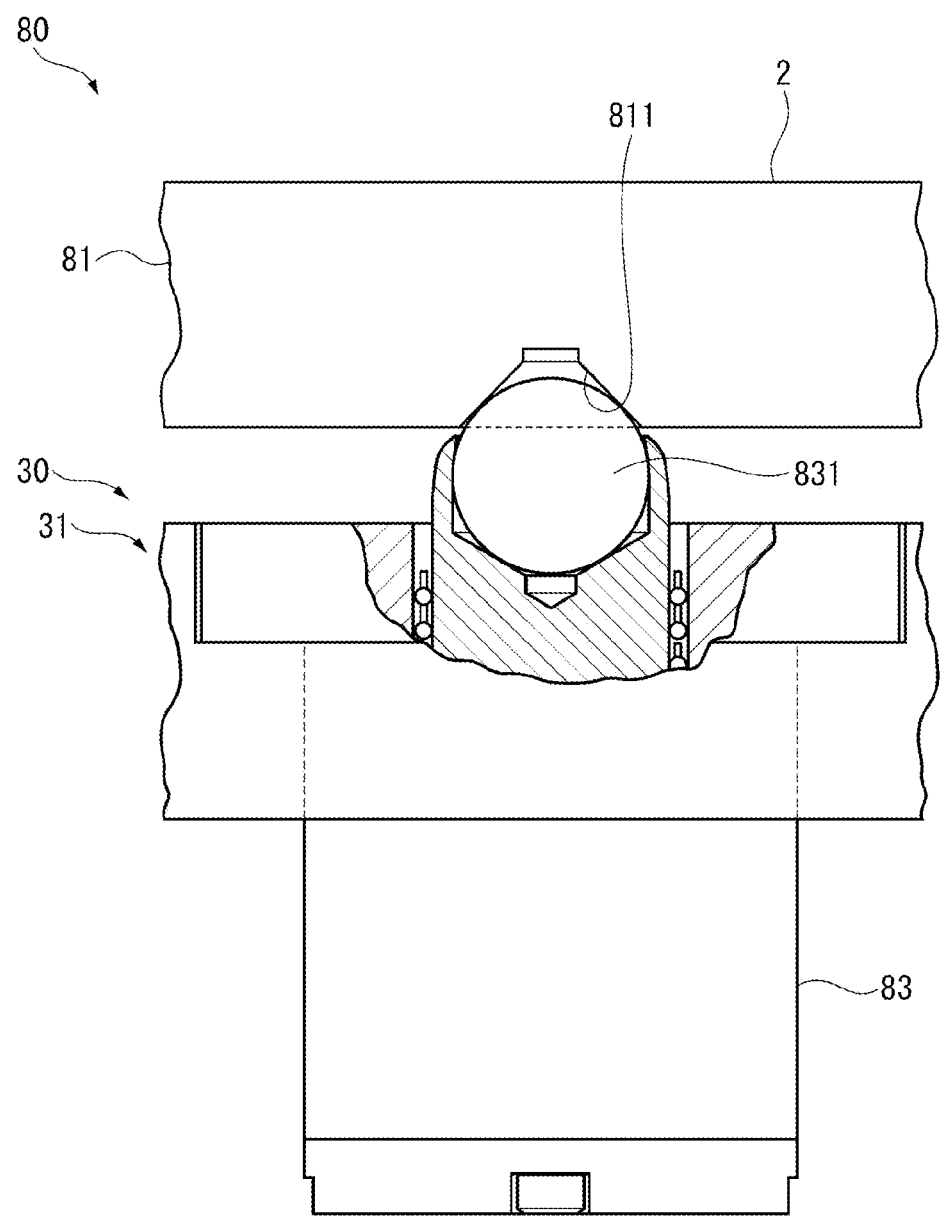
FIG. 18 is a cross-sectional view illustrating a support structure of a table according to the fourth embodiment.

As shown in FIG. 18, a plurality of triangular grooves 811 linked in a diameter direction are formed on the bottom surface of the table member 81 (in the present embodiment, three are formed at intervals of 120°). The air cylinder 83 includes a ball 831 on a top end. By engaging with the triangular groove 811 using the ball 831, the table 2 (table member 81) and the table apparatus 30 can be automatically aligned.

Figure 19:
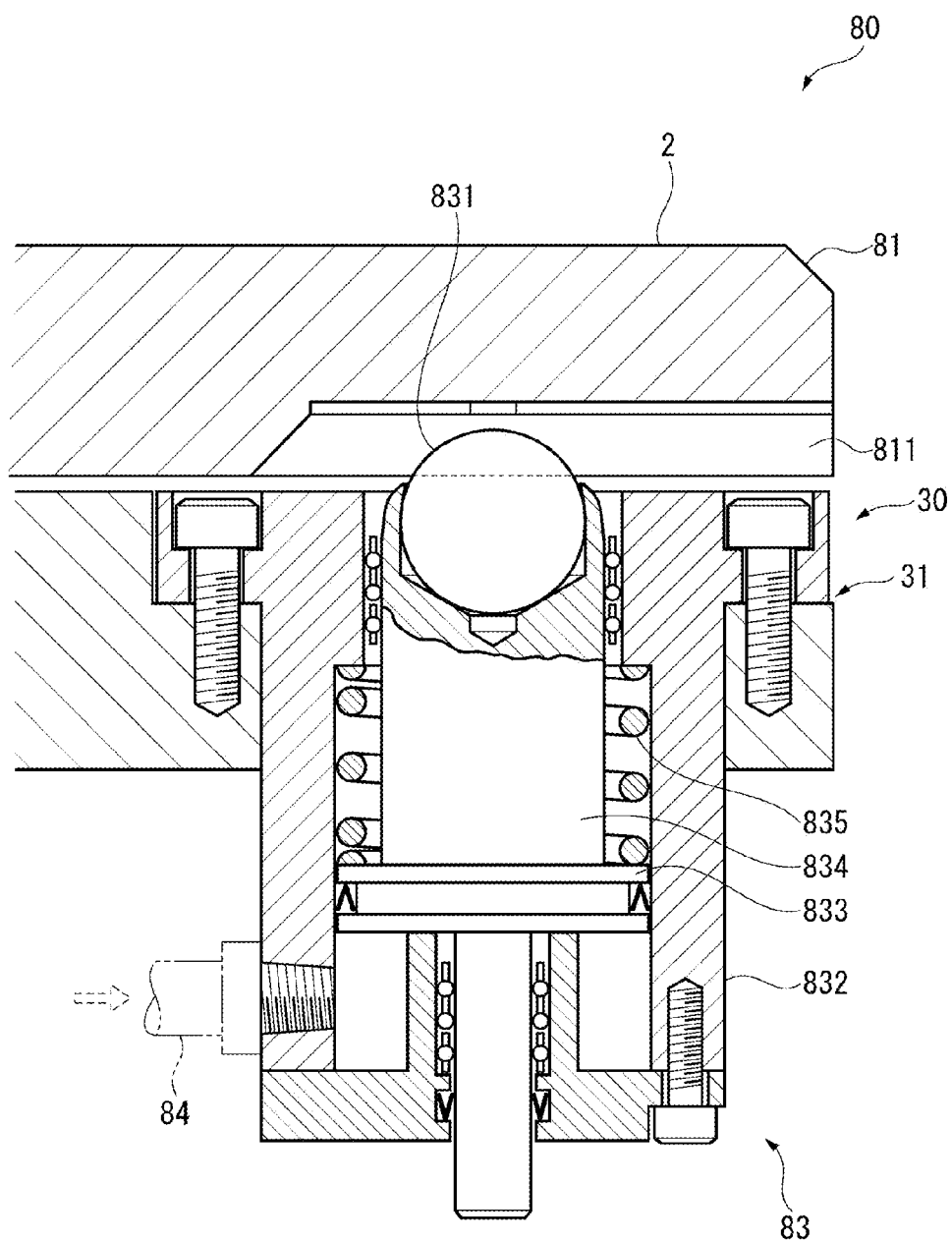
FIG. 19 is a cross-sectional view illustrating a lower limit state of the table according to the fourth embodiment.
Figure 20:
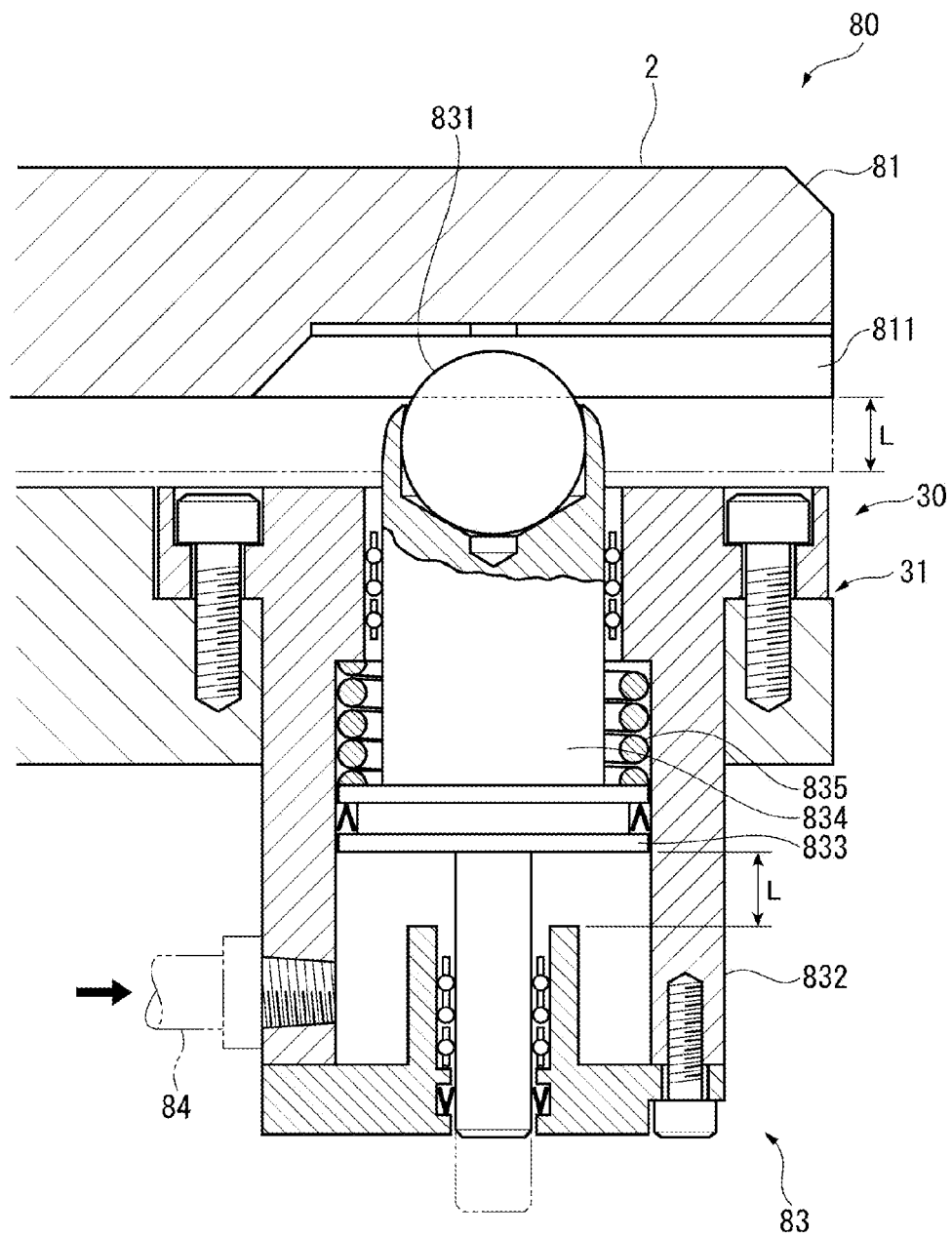
FIG. 20 is a cross-sectional view illustrating an upper limit state of the table according to the fourth embodiment.

In FIGS. 19 and 20, the air cylinder 83 includes a case 832 fixated to the table main body 31 and a displacement member 833 capable of vertical displacement within the case 832. A piston 834 is formed on the displacement member 833, and the piston 834 is biased downward by a coil spring 835. A pipe 84 is connected to the case 832 at a position lower than the piston 834.

In the air cylinder 83, the piston 834 and the ball 831 are lifted by supplying pressurized air from the pipe 84, and the table 2 is lifted. Meanwhile, the piston 834 and the ball 831 are lowered by exhausting pressurized air on the interior, and the table 2 is lowered. Moreover, the upper lift limit of the table 2 using the air cylinders 83 is defined as the distance L (see FIG. 16).

Returning to FIG. 17, the pipe 84 connected to the air cylinder 83 is drawn out below the drive motor 34 through a center portion of the table main body 31, passes through an interior of the measuring device main body 10 via a freely rotating coupler or the like (not shown in the drawings), and is connected to the air supply device 50. A control valve 85 is installed at a midway portion of the pipe 84, and the control valve 85 is connected to the control device 60 via the controller 61 (similar to the control valve 75 of the first embodiment, described above).

Accordingly, in the present embodiment, the control valve 85 opens and closes in accordance with an operation command from the control device 60, and by pressurized air being intermittently provided to the pipe 84, the table 2 can be lifted and lowered using the air cylinders 83. In the present embodiment, the lifting/lowering mechanism 80 is configured by the table member 81, air cylinder 83, pipe 84, and control valve 85, and the lifting/lowering device is configured by the addition of the lifting/lowering mechanism 80.

Moreover, a proximity sensor 82 may also be installed at a center of the top surface of the table member 81, and configured so as to monitor the approach of the work piece 3 with the control device 60. With such a configuration, the proximity and contact between the work piece 3 and the table 2 can be reliably known, enabling finer movement. The configuration can also be used to perform a rapid stop or the like to prevent a collision.

In the present embodiment, the table 2 can be lifted and lowered in a manner similar to that of the first embodiment, described above. In addition, when placing the work piece 3 on the table 2, a collision between the table 2 and the work piece 3 can be prevented using operations similar to those of the procedure shown in FIGS. 11 and 12A to 12C (first embodiment) or FIGS. 14 and 15A to 15D (second embodiment).

Moreover, a device added to lift and lower the table 2 may simply be the lifting/lowering mechanism 80 (the table member 81, the air cylinders 83, the pipe 84, and the control valve 85) lifting and lowering with respect to the table apparatus 30, and therefore the configuration of the device can be simplified. In particular, the table member 81 and air cylinders 83, as the lifting/lowering device, are installed in the table apparatus 30; therefore, the configuration of the measuring device can be simplified and made smaller.

Furthermore, only the table 2 (table member 81) is lifted and lowered; therefore, the lifting/lowering portion can be kept to a minimum. In other words, only the table 2 is lifted and lowered with the work piece 3, and the entire measuring device main body 10 and table apparatus 30 need not be lifted and lowered. Therefore, drive force for lifting and lowering can be reduced.

Fifth Embodiment

Figure 21:
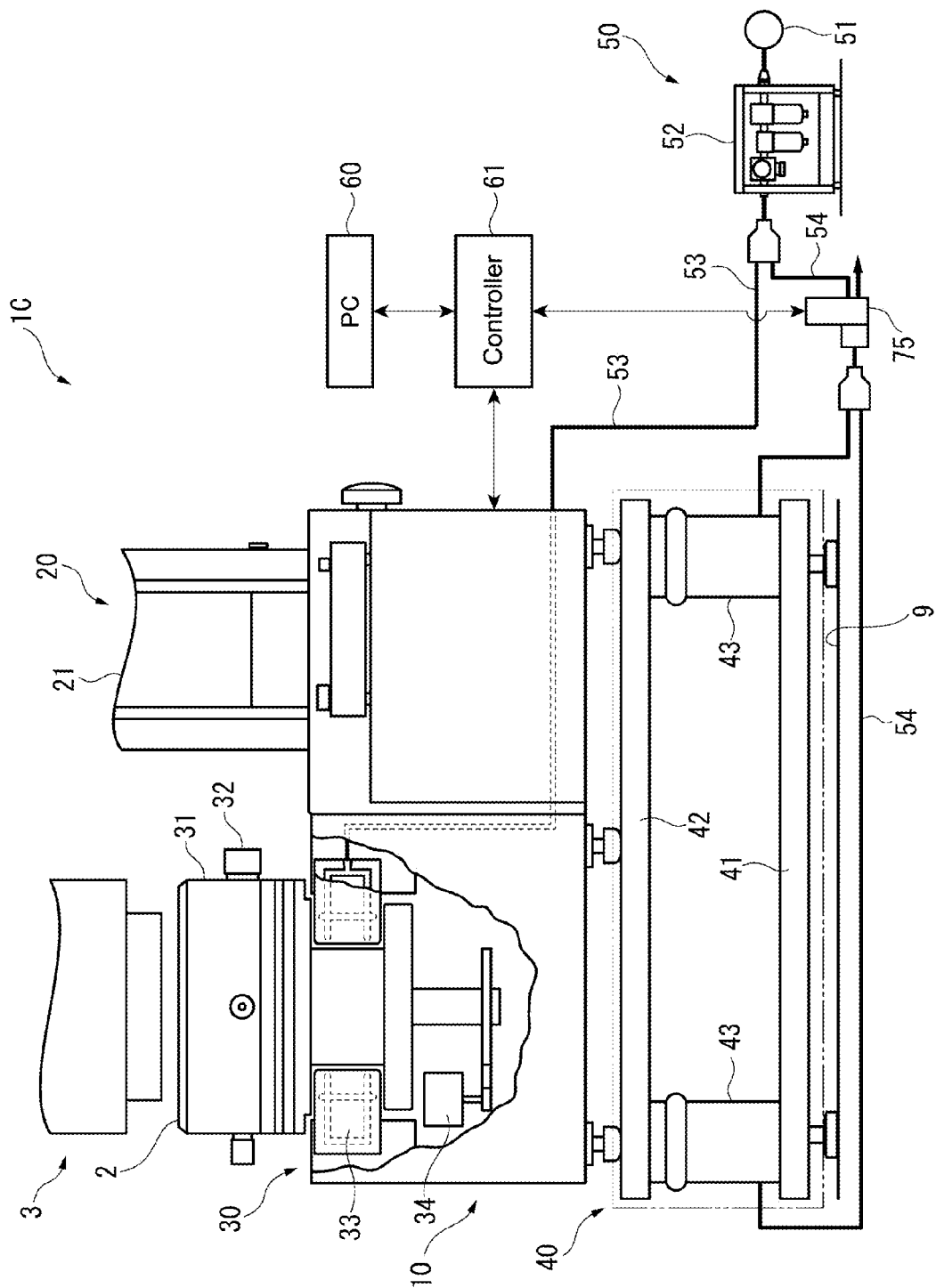
FIG. 21 illustrates a configuration of a fifth embodiment of the present invention.

FIG. 21 illustrates a fifth embodiment according to the present invention. Each of the embodiments described above includes the tilt adjustment mechanism 49 of the anti-vibration table 40, and each has the adjustment valve 45 installed on each gas spring 43. However, the present invention may also be configured such that the lifting/lowering device is configured using an anti-vibration table 40 that does not include the tilt adjustment mechanism 49.

In FIG. 21, a roundness measuring device 1C according to the present embodiment has a basic configuration similar to that of the roundness measuring device 1 according to the first embodiment, described above. However, the pipe 54 from the air supply device 50 is connected directly to the gas springs 43 of the anti-vibration table 40, and the control valve 75 is installed at a midway portion of the pipe 54.

In this embodiment, by supplying pressurized air to the gas springs 43 or exhausting the pressurized air by disconnecting the control valve 75 with the control device 60, expansion and contraction of all of the gas springs 43 can be controlled collectively. In addition, by expanding and contracting all of the gas springs 43 collectively, the gas springs 43 can act as a lifting/lowering device.

Modifications

Moreover, the present invention is not limited to the above-described embodiments, and includes modifications within a scope capable of achieving the advantages of the present invention. For example, the table apparatus 30 is not limited to being floating supported by the air hydrostatic bearings 33, and may instead be supported by a static oil pressure bearing, for example, or by a bearing in which a ball or the like rolls accompanying contact.

The anti-vibration table 40 is not limited to using the gas springs 43. For example, a mechanical cushion may be used, or a lifting/lowering device may be configured by adding a lifting/lowering mechanism to such a mechanical anti-vibration table. However, by adopting the table apparatus 30 using the air hydrostatic bearings 33 and the anti-vibration table 40 using the gas springs 43, the air supply device 50 can be shared for this purpose.

Moreover, in each of the embodiments, the lifting/lowering device was configured to perform lifting and lowering using pressurized air; therefore, the air supply device 50 can be shared for use in driving the lifting/lowering device. However, using the air supply device 50 as a drive source for each of these components is not required by the present invention, and other drive methods may be used instead, such as hydraulic drive, electromagnetic solenoid drive, motor drive, or the like.

In the above-noted embodiments, a description was given of examples in which the present invention was applied to a roundness measuring device. However, various measuring devices measuring a dimension or shape of a product can be used as the measuring device of the present invention. For example, the present invention can be applied to a coordinate measuring device measuring various point positions on a surface of a product; a surface characteristic measuring device measuring a fine shape, profile, or roughness of the surface of the product (shape measuring device, profile measuring device, or surface roughness measuring device); or a roundness measuring device measuring roundness of a cylindrical product, for example.

Moreover, the table on which the work piece is placed is not limited to a rotating table as in each of the above-described embodiments. An XY table (such as a coordinate measuring device) displacing in a plane can be used instead. Examples of a table displacing in a plane may also include a table displacing only in one of the X or Y axis directions.

On the other hand, the table may also be capable of displacing in a Z axis direction in addition to the two X and Y axes.

The present invention can be utilized in a method of placing a work piece on a measuring device and in a measuring device, and can be utilized particularly favorably in a case where a work device having significant weight is to be measured.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A method of placing a work piece on a measuring device where a work piece is placed on a table of a measuring device, the method comprising:
   using a retainer capable of holding the work piece above the table;
   using an adjuster capable of lifting and lowering a top surface of the table;
   holding the work piece above the table with the retainer;
   lifting the top surface of the table with the adjuster to bring the top surface of the table into contact with a bottom surface of the work piece; and
   after a load of the work piece is borne by the table, releasing the hold of the retainer on the work piece.

2. The method of placing the work piece on the measuring device according to claim 1, wherein an operation in which the load of the work piece is borne on the table is an operation which, after lifting the table and bringing the table into contact with the bottom surface of the work piece, continues lifting the table and bears the load of the work piece on the table.

3. The method of placing the work piece on the measuring device according to claim 1, wherein:
   the work piece is held above the table by the retainer, the table occupying a reference position,
   the top surface of the table is lifted from the reference position by the adjuster and is brought into contact with the bottom surface of the work piece,
   after the load of the work piece is borne by the table, the hold of the retainer is released, and
   the top surface of the table is lowered by the adjuster and returned to the reference position.

4. The method of placing the work piece on the measuring device according to claim 2, wherein:
   the work piece is held above the table by the retainer, the table occupying a reference position,
   the top surface of the table is lifted from the reference position by the adjuster and is brought into contact with the bottom surface of the work piece,
   after the load of the work piece is borne by the table, the hold of the retainer is released, and
   the top surface of the table is lowered by the adjuster and returned to the reference position.

5. The method of placing the work piece on the measuring device according to claim 1, wherein:
   the top surface of the table is lowered by the adjuster to a standby position, which is lower than the reference position,
   the work piece is held by the retainer at a position above the table and lower than the reference position,
   the top surface of the table is lifted from the standby position by the adjuster and is brought into contact with the bottom surface of the work piece,
   after the load of the work piece is borne by the table, the hold of the retainer is released, and
   the top surface of the table is lifted by the adjuster and returned to the reference position.

6. The method of placing the work piece on the measuring device according to claim 2, wherein:
   the top surface of the table is lowered by the adjuster to a standby position, which is lower than the reference position,
   the work piece is held by the retainer at a position above the table and lower than the reference position,
   the top surface of the table is lifted from the standby position by the adjuster and is brought into contact with the bottom surface of the work piece,
   after the load of the work piece is borne by the table, the hold of the retainer is released, and
   the top surface of the table is lifted by the adjuster and returned to the reference position.

7. A measuring device comprising:
   a table having a top surface of which a work piece is placed, the table installed on a base;
   a measurer configured to measure the work piece placed on the top surface;
   an adjuster installed in an area between the top surface and the base and configured to lift and lower the top surface with respect to the base; and
   a controller configured to:
      control the adjuster
      lift the top surface in a state where the work piece is held above the top surface, and
      bring the top surface into contact with the bottom surface of the work piece, after which the load of the work piece is borne by the table.

8. The measuring apparatus according to claim 7, wherein:
   the adjuster comprises:
      an anti-vibration table provided between the table and the base, the anti-vibration table comprising:
         a bottom surface member arranged on the base;
         a top surface member supporting the table; and
         a gas spring installed on the bottom surface member and supporting the top surface member;
      a gas route supplying gas to the gas spring; and
      a control valve configured to control the gas supply of the gas route, and
   the controller is configured to control operations of the adjuster by controlling the gas supply to the gas spring using the control valve.

9. The measuring device according to claim 8, wherein:
the anti-vibration table has tilt adjustment performance and comprises:
- a plurality of the gas springs installed between the top surface member and the bottom surface member; and
- an adjustment valve connected to each of the gas springs, the adjustment valve adding gas from the gas route when the gas springs are compressed and exhausting gas from the gas springs when the gas springs are stretched out, the adjuster comprises:
- the anti-vibration table; and
- a valve open/close controller configured to forcibly open and close the adjustment valve, and the controller is configured to control the gas supply to the gas springs by forcibly opening and closing the adjustment valve using the valve open/close controller.

10. The measuring device according to claim 7, wherein the adjuster is a lifting/lowering mechanism provided to the table and configured to support the top surface so as to be capable of lifting and lowering.

* * * * *